(12) United States Patent
Kuramitsu et al.

(10) Patent No.: US 10,077,069 B2
(45) Date of Patent: Sep. 18, 2018

(54) SENSOR DEVICE AND ELECTRIC POWER STEERING DEVICE USING SAME

(71) Applicant: DENSO CORPORATION, Kariya, Aichi-pref. (JP)

(72) Inventors: Shuji Kuramitsu, Kariya (JP); Katsuhiko Hayashi, Kariya (JP); Takaharu Kozawa, Kariya (JP); Kouichi Nakamura, Kariya (JP); Masaya Taki, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 52 days.

(21) Appl. No.: 15/238,356

(22) Filed: Aug. 16, 2016

(65) Prior Publication Data
US 2017/0050670 A1 Feb. 23, 2017

(30) Foreign Application Priority Data
Aug. 21, 2015 (JP) .................................. 2015-163650

(51) Int. Cl.
 *B62D 5/04* (2006.01)
 *B62D 6/10* (2006.01)
 *G01L 5/22* (2006.01)

(52) U.S. Cl.
 CPC .......... *B62D 5/0484* (2013.01); *B62D 5/049* (2013.01); *B62D 5/0463* (2013.01); *B62D 6/10* (2013.01); *G01L 5/22* (2013.01)

(58) Field of Classification Search
 CPC .... B62D 5/0484; B62D 5/0463; B62D 5/049; B62D 6/10; G01L 5/22
 USPC ........................................................... 701/42
 See application file for complete search history.

(56) References Cited

U.S. PATENT DOCUMENTS

| | | | |
|---|---|---|---|
| 6,498,451 B1 * | 12/2002 | Boules ................. | B62D 5/0403 318/400.06 |
| 2007/0205041 A1 * | 9/2007 | Nishizaki ............. | B62D 5/0472 180/446 |
| 2008/0004783 A1 * | 1/2008 | Mizon ................ | B60K 23/0808 701/67 |
| 2008/0021614 A1 * | 1/2008 | Endo .................... | B62D 5/0463 701/41 |
| 2008/0047775 A1 * | 2/2008 | Yamazaki ............ | B62D 5/0463 180/443 |

(Continued)

*Primary Examiner* — Atul Trivedi
(74) *Attorney, Agent, or Firm* — Knobbe, Martens, Olson & Bear, LLP

(57) ABSTRACT

A sensor device includes a main sensor, a sub sensor, and an Electronic Control Unit (ECU). The ECU has a torque calculator that sets, as a steering torque, a main steering torque that is calculated based on a main sensor signal when a main output signal is normal. During a transition period between an abnormality detection and an abnormality establishment regarding the main output signal, the torque calculator calculates the steering torque based on (i) a sub steering torque calculated based on a sub sensor signal and (ii) a prior-to-abnormality-detection main steering torque. In such manner, even when abnormality is detected in a part of the sensor signals, a fluctuation of the steering torque due to, or accompanying, the switching of the steering torque calculation to a normal signal only calculation is prevented.

13 Claims, 10 Drawing Sheets

(56) References Cited

U.S. PATENT DOCUMENTS

| | | | |
|---|---|---|---|
| 2009/0114470 A1* | 5/2009 | Shimizu | B62D 1/16 |
| | | | 180/444 |
| 2009/0240389 A1* | 9/2009 | Nomura | B62D 5/046 |
| | | | 701/31.4 |
| 2009/0312909 A1* | 12/2009 | Onunna | B62D 6/007 |
| | | | 701/41 |
| 2010/0084215 A1* | 4/2010 | Sakatani | B62D 6/10 |
| | | | 180/444 |
| 2011/0010052 A1* | 1/2011 | Limpibunterng | B62D 5/046 |
| | | | 701/41 |
| 2012/0158335 A1 | 6/2012 | Donovan et al. | |
| 2013/0261898 A1* | 10/2013 | Fujita | B62D 7/159 |
| | | | 701/42 |
| 2014/0353073 A1* | 12/2014 | Banno | B62D 5/0481 |
| | | | 180/446 |

* cited by examiner

SENSOR DEVICE AND ELECTRIC POWER STEERING DEVICE USING SAME

CROSS REFERENCE TO RELATED APPLICATION

The present application is based on and claims the benefit of priority of Japanese Patent Application No. 2015-163650, filed on Aug. 21, 2015, the disclosure of that is incorporated herein by reference.

TECHNICAL FIELD

The present disclosure generally relates to a sensor device and an electric power steering device using the sensor device.

BACKGROUND INFORMATION

Generally, a sensor device that transmits sensor data to a controller is known in the art of motor control. For example, in a patent document, JP 2013-546096 A (patent document 1), the transmission of sensor data is synchronized by using a trigger signal that is generated by a controller and received by a bi-direction node.

In such configuration, sensor data may become abnormal, due to abnormality of a sensor element, or other causes. However, the patent document 1 is silent about how to handle sensor data, when the abnormality is detected.

SUMMARY

It is an object of the present disclosure to provide a sensor device and an electric power steering device, in which, in case of having abnormality in a part of sensor signals, a fluctuation of a calculated physical quantity due to a switching of calculation, i.e., from calculation by using partially-abnormal signals to calculation only by using normal signals.

In an aspect of the present disclosure, the sensor device includes: a main sensor, a sub sensor, and a controller.

The main sensor includes (i) a main sensor element for detecting a physical quantity of a detection object and (ii) a main output circuit for generating and outputting a main output signal that includes a main sensor signal corresponding to a detection value of the main sensor element.

The sub sensor includes (i) a sub sensor element for detecting a physical quantity of the detection object and (ii) a sub output circuit for outputting a sub output signal that includes a sub sensor signal corresponding to a detection value of the sub sensor element, and a timing of output of the sub output signal is shifted from a timing of output of the main output signal by an amount shorter than one signal cycle.

The controller includes a signal obtainer obtaining the main output signal and the sub output signal, an abnormality detector detecting abnormality of the main output signal and the sub output signal, and a physical quantity calculator calculating a target physical quantity by using at least one of the main sensor signal and the sub sensor signal.

The physical quantity calculator uses a main physical quantity that is calculated based on the main sensor signal as the target physical quantity when the main output signal is normal.

The physical quantity calculator calculates the target physical quantity, during a transition period from a detection of abnormality in the main output signal to an establishment of abnormality of the main output signal, based on both of (i) a sub physical quantity that is calculated based on the sub sensor signal and (ii) the main physical quantity generated prior to the detection of abnormality in the main output signal.

The transition period may also be worded as a "not-yet determined" period, that is, a period during which the abnormality of the main output signal is not yet determined, or not yet absolutely/firmly established.

Therefore, since the sensor device of the present disclosure is devised to include the main sensor and the sub sensor, and the signal obtainer obtains the main output signal and the sub output signal, even when the abnormality is caused in some signals, e.g., in a part of sensor signals, the calculation of the target physical quantity is continuous.

Further, the target physical quantity during the transition period is calculated based on the sub physical quantity and the main physical quantity before detection of abnormality.

Thereby, when the abnormality is caused in some signals, a fluctuation of the target physical quantity due to the switching of the calculations, i.e., from the calculation by using the abnormal signal to a calculation only by using the normal signal, is controlled, i.e., is prevented or at least reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
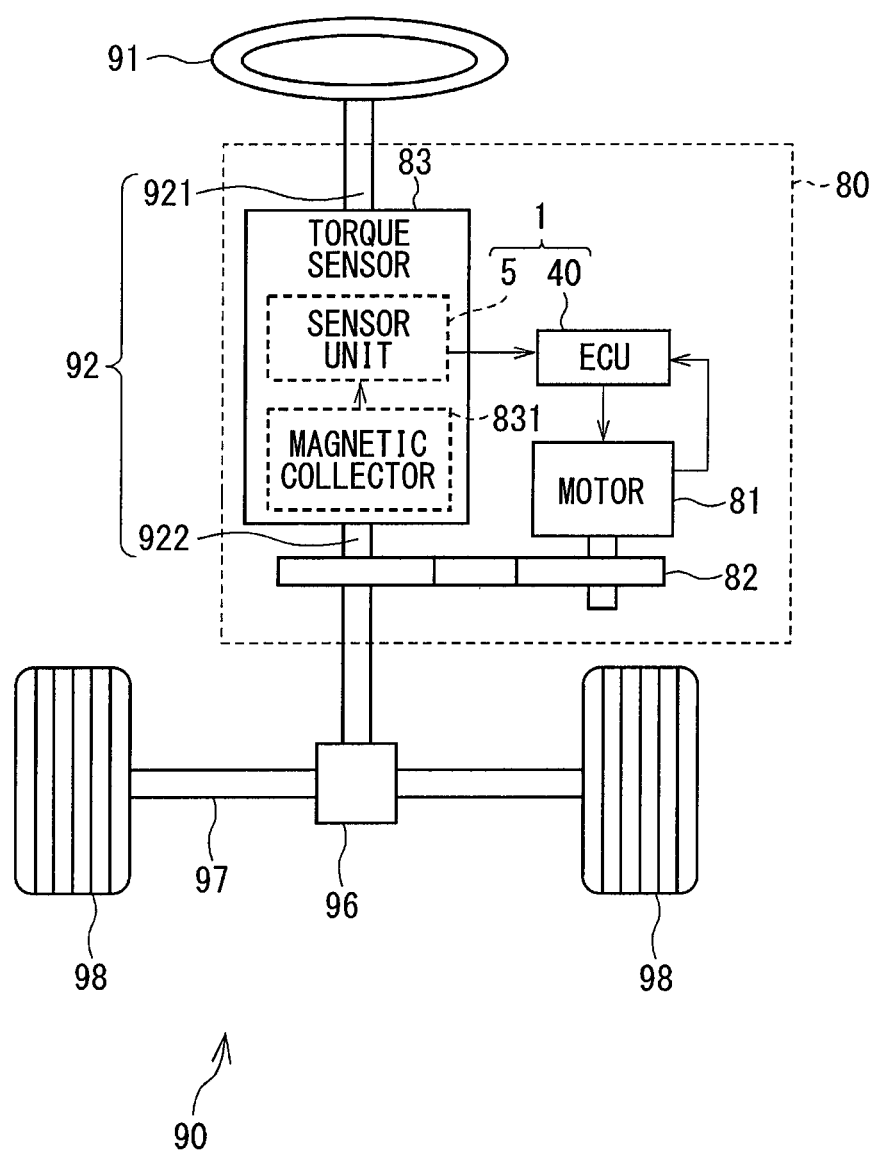
FIG. 1 is an outline block diagram of a steering system in a first embodiment of the present disclosure.

Hereafter, the sensor device of the present disclosure and the electric power steering device using the same are described based on the drawing.

Hereafter, in the following embodiments, the same numerals are assigned to the same components, and the description of the same components is not repeated.

First Embodiment

The first embodiment of the present disclosure is shown in FIGS. 1-5.

As shown in FIG. 1, a sensor device 1 is applied to an electric power steering device 80, and includes a sensor unit 5 and an Electronic Control Unit (ECU) 40 that serves as a controller, for example, together with other parts, for assisting the steering operation of a vehicle.

The entire configuration of a steering system 90 having the electric power steering device 80 is shown in FIG. 1.

A steering wheel 91 as a steering member is connected with a steering shaft 92. The steering shaft 92 has an input shaft 921 as a first shaft, and an output shaft 922 as a second shaft. The input shaft 921 is connected with the steering wheel 91. Between the input shaft 921 and the output shaft 922, a torque sensor 83 that detects a torque applied to the steering shaft 92 is disposed.

A pinion gear 96 is disposed at an opposite tip of the output shaft 922 relative to the input shaft 921. The pinion gear 96 engages with a rack shaft 97. A pair of wheels 98 is connected with both ends of the rack shaft 97 via tie rods etc.

When the driver rotates the steering wheel 91, the steering shaft 92 connected with the steering wheel 91 also rotate. The rotational movement of the steering shaft 92 is turned into the translational movement of the rack shaft 97 by the pinion gear 96, and the pair of wheels 98 is steered by an angle according to the amount of displacement in the translational movement of the rack shaft 97.

The electric power steering device 80 is provided with a motor 81 that outputs an assist torque that assists a steering operation of the steering wheel 91 by the driver, a speed reduction gear 82 that serves as a power transmission unit, a torque sensor 83, the ECU 40 or the like. Although the motor 81 and the ECU 40 have separate bodies in FIG. 1, they may be combined to have one body.

The speed reduction gear 82 reduces a rotation speed of the motor 81, and transmits the rotation to the steering shaft 92. That is, although the electric power steering device 80 of the present embodiment is what is called a "column assist type", the steering device 80 may also be a "rack assist type" in which the rotation of the motor 81 is transmitted to the rack shaft 97. In other words, the "drive object" is, in the present embodiment, the steering shaft 92, but it may also be the rack shaft 97.

The details of the ECU 40 are mentioned later.

The torque sensor 83 is disposed on the steering shaft 92, and detects a steering torque based on a twist angle between the input shaft 921 and the output shaft 922.

The torque sensor 83 has a torsion bar (not illustrated), a magnetic flux collector 831, the sensor unit 5 and the like.

The torsion bar coaxially connects the input shaft 921 and the output shaft 922 on their rotation axis, and converts a torque applied to the steering shaft 92 into a twist displacement.

The magnetic flux collector 831 has a multipolar magnet, a magnetic yoke, a magnetic collecting ring, etc., and is configured to have the magnetic flux density changed according to an amount of the twist displacement and a twist displacement direction of the torsion bar. Since the torque sensor 83 is well-known in the art, the configuration of the torque sensor 83 is omitted from the description.

Figure 2:
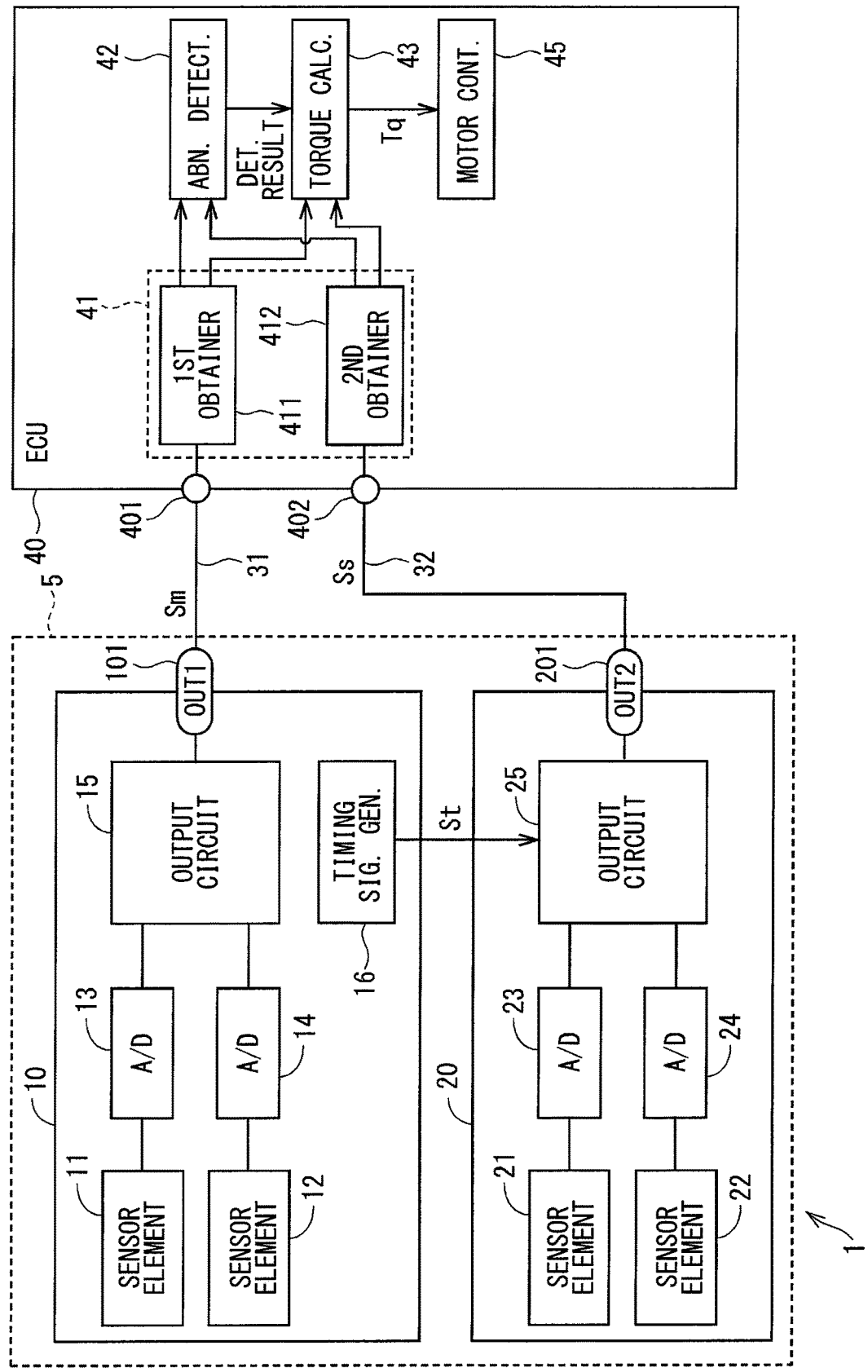
FIG. 2 is a block diagram of a sensor device in the first embodiment of the present disclosure.

As shown in FIG. 2, the sensor unit 5 is provided with a main sensor 10 and a sub sensor 20.

The main sensor 10 has a first main sensor element 11, a second main sensor element 12, Analog-to-Digital (A/D)-conversion circuits 13 and 14, a main output circuit 15, and a timing signal generation circuit 16. The sub sensor 20 has a first sub sensor element 21, a second sub sensor element 22, A/D-conversion circuits 23 and 24, and a sub output circuit 25.

The first sub sensor element 21, the second sub sensor element 22, the A/D-conversion circuits 23 and 24, and the sub output circuit 25 are basically the same as the "counterpart", i.e., are basically the same as the first main sensor element 11, the second main sensor element 12, the A/D-conversion circuits 13 and 14, and the main output circuit 15. Therefore, the description is focused on the main sensor 10, saving the redundant description for the sub sensor 20.

A communication terminal 101 is provided in the main sensor 10. The communication terminal 101 is connected with a communication terminal 401 of the ECU 40 by a communication line 31.

A communication terminal 201 is provided in the sub sensor 20. The communication terminal 201 is connected with a communication terminal 402 of the ECU 40 by a communication line 32.

The main sensor 10 and the sub sensor 20 are connected with the ECU 40 by a power supply line and a ground line (not illustrated), respectively.

The voltage adjusted to a predetermined voltage value (e.g., 5 [V]) by a regulator of the ECU 40 (not illustrated) is supplied to the main/sub sensors 10 and 20 via the power supply line.

The main/sub sensors 10 and 20 are connected with the ground via the ground line and the ECU 40.

The first main sensor element 11 and the second main sensor element 12 are magnetism detection elements that detect a change of the magnetic flux of the magnetic flux collector 831 according to the steering torque. The first main sensor element 11 and the second main sensor element 12 of the present embodiment are Hall devices, respectively.

The A/D-conversion circuit 13 performs an A/D conversion of the detection value of the first main sensor element 11. The A/D-conversion circuit 14 performs an A/D conversion of the detection value of the second main sensor element 12.

The main output circuit 15 generates a main output signal Sm including the first main sensor signal according to the detection value of the first main sensor element 11 that has been A/D-converted, and the second main sensor signal according to the detection value of the second main sensor element 12 that has been A/D-converted.

According to the present embodiment, the main sensor elements 11 and 12 are configured to detect the detection value in a cycle shorter than a signal cycle Ps of the main output signal Sm, and the main output circuit 15 generates the main output signal Sm using the latest detection value. The sub output circuit 25 generates a sub output signal Ss similarly by using the latest detection value.

The timing signal generation circuit 16 generates a timing signal St that instructs an output timing of the sub output signal Ss, and outputs the sub output signal Sd to the sub output circuit 25.

The sub output circuit 25 generates the sub output signal Ss including the first sub sensor signal according to the detection value of the first sub sensor element 21 that has been A/D-converted, and the second sub sensor signal according to the detection value of the second sub sensor element 22 that has been A/D-converted.

The sub output circuit 25 outputs the sub output signal Ss to the ECU 40 at a timing of obtaining the timing signal St.

According to the present embodiment, the output signals Sm and Ss are output to the ECU 40 by the Single Edge Nibble Transmission (by SENT) communication, which is a kind of digital communication.

Figure 3:
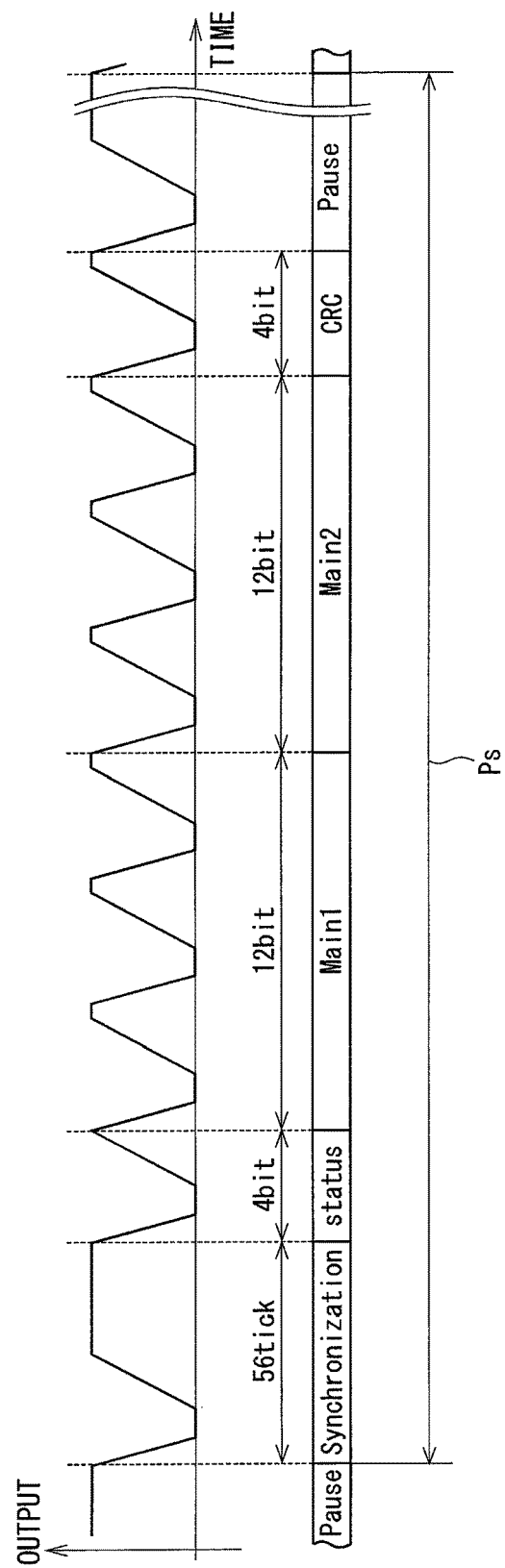
FIG. 3 is a time diagram of a communication frame of a main output signal in the first embodiment of the present disclosure.

Here, the communication frame of the main output signal Sm is described based on FIG. 3.

The main output signal Sm includes a synchronization signal, a status signal, a main sensor signal, a Cyclic Redundancy Check (CRC) signal, and a pause signal in the first output signal Sd1. These signals in the first output signal Sd1 are output as a series of signals in the presently written order. The number of bits of each signal shown in FIG. 3 is only an example, and may be changed according to the telecommunications standard or the like. The data in SENT communication is represented by a time width between a falling edge of one signal, and a falling edge of the next signal.

The synchronization signal is a signal for synchronizing the clock of the main sensor 10 and the clock of the ECU 40, and is set to 56 ticks in the present embodiment. In the present embodiment, a correction coefficient is calculated based on the length of the synchronization signal, and each signal is corrected by using the correction coefficient concerned.

The status signal includes an update counter signal. The update counter signal is updated every time the output signal Sd1 is generated, as shown in the following manner of a two-bit update counter signal, i.e., 00→01→10→11→00→01 - - - . After the update counter reaches the maximum value of "11", the update counter returns to the minimum value of "00" by an addition of +1. By transmitting the information on the update counter, the ECU 40 is enabled to determine whether the two same data transmitted in a row is caused by the two same detection values, or by the data adhesion error among them.

The main sensor signals are the first main sensor signal and the second main sensor signal. The first main sensor signal is a signal based on the detection value of the first main sensor element 11, and the second main sensor signal is a signal based on the detection value of the second main sensor element 12.

In FIG. 3, the first main sensor signal is shown as "Main1", and the second main sensor signal is shown as "Main2."

Each of the first main sensor signals and the second main sensor signals is represented by 3 nibbles (=12 bits). According to the present embodiment, the main sensor signal and the sub sensor signal are provided as nibble signals for an output of the main output signal Sm to the ECU 40 by the SENT communication. Note that the main sensor signal and the sub sensor signal may have at least 1 nibble or greater number of nibbles, which is determined according to the communication standard.

In the present embodiment, one of the first main sensor signal and the second main sensor signal is configured as an original signal that increases according to an increase of the detection value, and the other of the two signals is configured as an inverted signal that decreases according to an increase of the detection value. The first and second main sensor signals, when both are normal, always add up to the same predetermined addition value. In other words, when the addition of the first and second main sensor signals does not make the predetermined addition value, it is determined as abnormality, or a data error.

In FIG. 3, for simplification, the first and second main sensor signals are shown as a single line.

The CRC signal is a cyclic redundancy check signal for detecting abnormality in communication, and has a signal length that is calculated based on the first main sensor signal and the second main sensor signal.

The pause signal is a signal output in a period that extends to the next output of the synchronization signal.

The sub output signal Ss includes the synchronization signal, the status signal, the sub sensor signal, the CRC signal, and the pause signal.

The sub sensor signals are the first sub sensor signal and the second sub sensor signal. The first sub sensor signal is a signal based on the detection value of the first sub sensor element 21, and the second sub sensor signal is a signal based on the detection value of the second sub sensor element 22.

Since the details of the communication frame of the sub output signal Ss are the same as that of the main output signal Sm, no description regarding the communication frame of the sub output signal Ss is provided.

In the present embodiment, the output timings for outputting the output signals Sm and Ss are controlled by transmitting the timing signal St to the sub sensor 20 from the main sensor 10.

The timing signal St is output to the sub output circuit 25 from the timing signal generation circuit 16 at a certain timing in one frame of the main output signal Sm.

Figure 4:
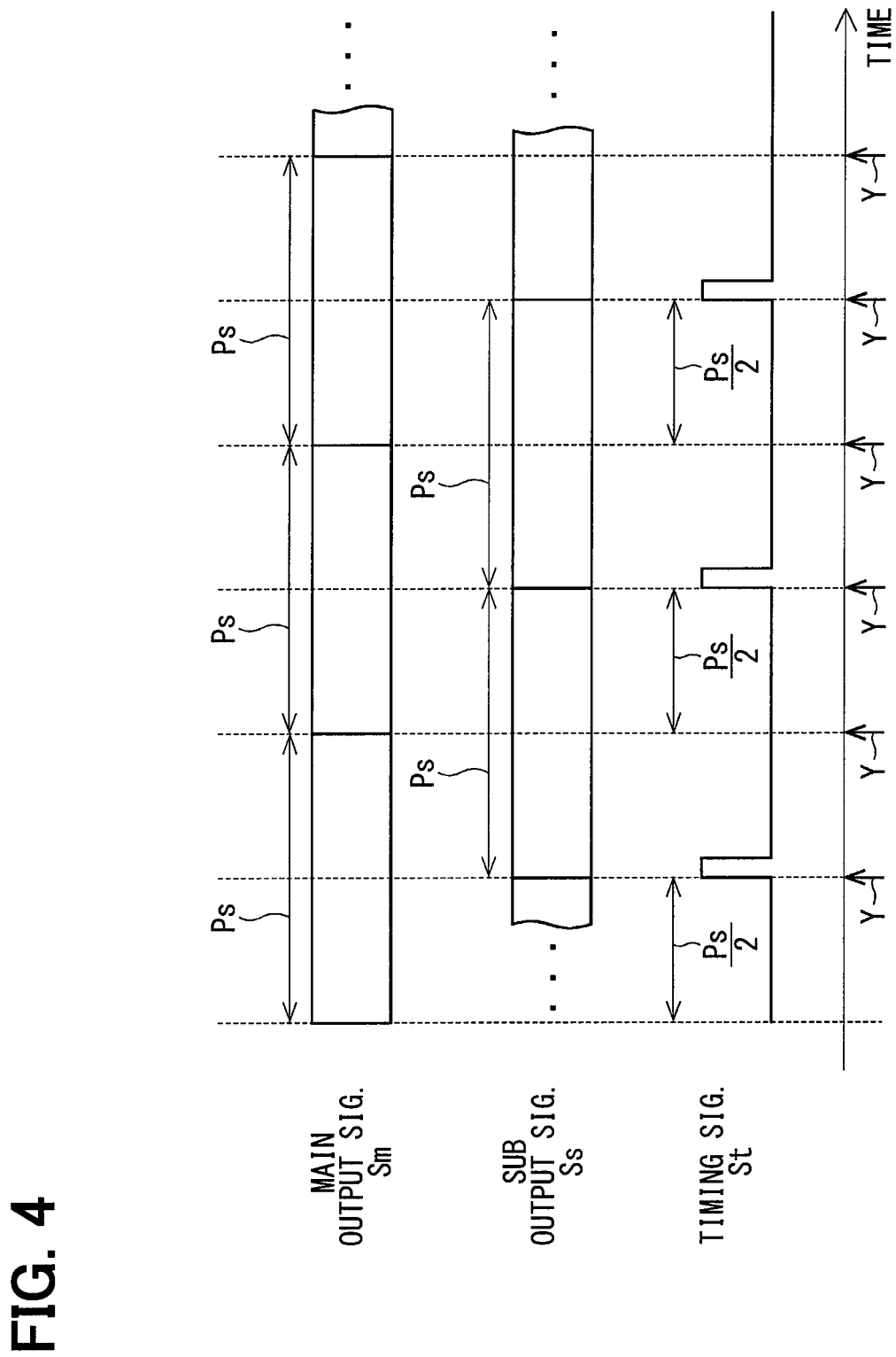
FIG. 4 is a time diagram of output timings of the main output signal and a sub output signal in the first embodiment of the present disclosure.

As shown in FIG. 4, in the present embodiment, the timing signal St is transmitted at a half-cycle shifted timing, i.e., at a timing that is shifted by an amount of half cycle, from a transmission timing of the main output signal Sm.

More specifically, the timing signal St is transmitted with a shift/delay mount of Ps/2 after a start of the synchronization signal of the main output signal Sm. Thereby, the sub output circuit 25 outputs the sub output signal Ss at a timing shifted by the half cycle from the output of the main output signal Sm.

The ECU 40 obtains the output signals Sm and Ss at timings respectively shown by an arrow Y. That is, the ECU 40 obtains the output signals Sm and Ss for every half cycle of the signal cycle Ps in turns, by the shift of the output timing of the output signal Sm from the output timing of the output signal Ss. Thereby, the transmission speed of the output signals Sm and Ss is improved on appearance.

Referring back to FIG. 2, the ECU 40 is a processor implemented as a microcomputer and the like, for performing various processes and calculations. Each process in the ECU 40 may either be a software process by executing a pre-memorized program by a Central Processing Unit (CPU), or be a hardware process by a dedicated electronic circuit.

The ECU 40 includes a signal obtainer 41, an abnormality detector 42, a torque calculator 43 serving as a physical quantity calculator, and a motor controller 45, respectively as functional blocks.

Note that the functional blocks described above are only for explanation purposes. That is, a part of the abnormality detection process fundamentally provided by the abnormality detector 42 may be performed by, for example, the torque calculator 43, or other changes arbitrarily arranged.

The signal obtainer 41 has a first obtainer 411 and a second obtainer 412. The first obtainer 411 obtains the main output signal Sm from the main output circuit 15, and corrects each of the signals included in the main output signal Sm with a correction coefficient that is calculated based on the synchronization signal.

The second obtainer 412 obtains the sub output signal Ss from the sub output circuit 25, and corrects each of the signals included in the sub output signal Ss with a correction coefficient that is calculated based on the synchronization signal. Each of the corrected signals is output to the abnormality detector 42. Further, the corrected sensor signal is output to the torque calculator 43.

The abnormality detector 42 detects various abnormalities, such as data adherence abnormality, data abnormality, communication abnormality, sky/earth fault abnormality, and the like. The abnormality detection result is output to the torque calculator 43.

The torque calculator 43 calculates a steering torque Tq that is a target physical quantity. Specifically, a main steering torque Tm serving as a main physical quantity is calculated using the main sensor signal of the main output signal Sm.

The main steering torque Tm may be calculated by using one of the first main signal and the second main signal, or may be calculated based on an average or some other value calculated from the first and second main signals.

According to the present embodiment, when the main output signal Sm is normal, the main steering torque Tm is set to the steering torque Tq. That is, in other words, when the main output signal Sm is normal, the sensor signal of the sub output signal Ss will not be used for the calculation of the steering torque Tq.

Further, when the abnormality of the main output signal Sm becomes final and conclusive, i.e., is "established", a differently-calculated value is set to the steering torque Tq. That is, a sub steering torque Ts serving as a sub physical quantity that is calculated as a value by using the sub sensor signal of the sub output signal Ss, is set to the steering torque Tq.

The sub steering torque Ts may be calculated by using either one of the first sub signal or the second sub signal, or may be calculated based on an average of the first and second sub signals or some other values calculated from the first and second sub signals.

The calculated steering torque Tq is output to the motor controller 45.

The motor controller 45 controls the drive of the motor 81 based on the calculated steering torque Tq.

In detail, the motor controller 45 calculates a torque instruction value based on the steering torque Tq, and controls the drive of the motor 81 by the well-known method, e.g., a feedback control, based on the torque instruction value.

As described above, when the main output signal Sm is normal in the present embodiment, the steering torque Tq is calculated as the main steering torque Tm, and, when the main output signal Sm is abnormal, the steering torque Tq is switched to the sub steering torque Ts.

The main steering torque Tm and the sub steering torque Ts may vary, i.e., may be calculated as respectively different values, due to, for example, an influence of characteristic variation of the individual sensors or the like. Further, in the present embodiment, the output timing of the main output signal Sm, and the output timing of the sub output signal Ss are shifted from each other, which may also cause the variation among the torque Tm and the torque Ts due to the detection values detected at different timings.

Here, in case that the abnormality of the main output signal Sm is detected and the steering torque Tq is directly switched from the main steering torque Tm to the sub steering torque Ts, the steering torque Tq may possibly be steeply fluctuated, i.e., steeply changed or varied.

Since the sensor device 1 is applied to the electric power steering device 80, the sensor device 1 may cause a wrong steering feel for the driver of the vehicle due to an output of such a steeply fluctuated steering torque Ts, because the steering torque Ts output from the sensor device 1 is used for driving the motor 81 that outputs an assist torque for assisting the steering operation of the steering wheel by the driver.

Further, in the present embodiment, for preventing a fault determination, a preset period from the detection of abnormality in the main output signal Sm is reserved as a period of continued monitoring, during which no abnormality is "established" for the output signal Sm, and monitoring of the signal Sm is continued.

Thus, in the present embodiment, during a transition period, i.e., during a period from a detection of abnormality in the main output signal Sm to an establishment of abnormality of the main output signal Sm, the torque calculator 43 calculates the steering torque Tq by using (i) the sub steering torque Ts and (ii) the main steering torque Tm before detection of abnormality.

The transition period may also be worded as a "not-yet determined" period, that is, a period during which the abnormality of the main output signal is not yet determined, or not yet absolutely/firmly established. That is, the determination and the non-determination (i.e., not-yet determined state) of the signal abnormality are compared for clearly establishing the transition of the signal state.

Figure 5:
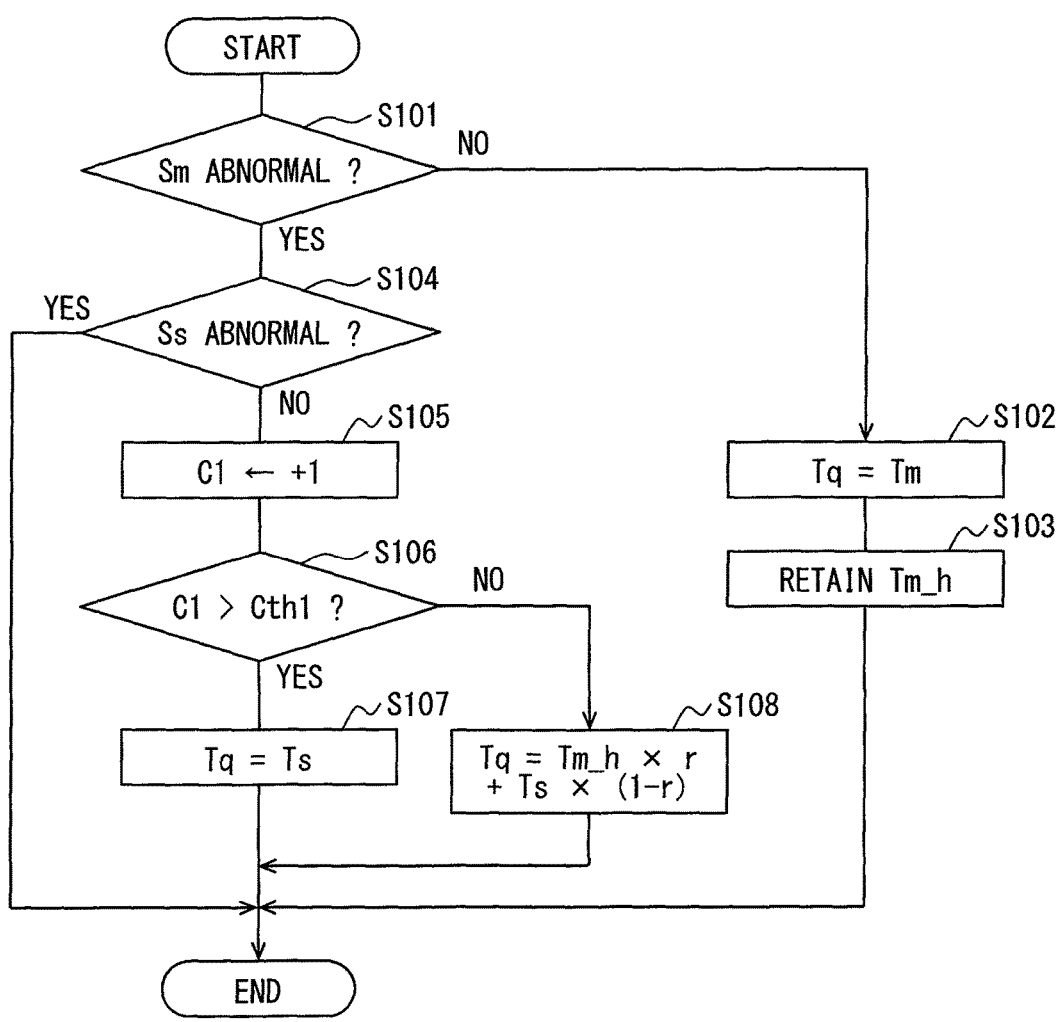
FIG. 5 is a flowchart of a torque calculation process in the first embodiment of the present disclosure.

The torque calculation process in the present embodiment is described based on a flowchart shown in FIG. 5.

This process is performed at a timing of obtaining the main output signal Sm during an operation of the ECU 40. That is, a calculation cycle of the torque calculation process is equal to the signal cycle Ps.

In the following, unless otherwise mentioned, the calculation is performed by using the latest main output signal Sm, or the latest sub output signal Ss. In the present embodiment, the timing of obtaining the main output signal Sm is shifted from the timing of obtaining the sub output signal Ss by an amount of the half cycle (i.e., Ps/2), which means that, for the torque calculation, the sub output signal Ss obtained ahead of time by half cycle relative to the main output signal Sm is used with the main output signal Sm.

In step S101, the abnormality detector 42 determines whether the abnormality of the main output signal Sm is detected. "Step" is abbreviated to "S" hereafter, for the brevity of description as Step S101 is abbreviated to "S101", for example.

When it is determined that the abnormality of the main output signal Sm is detected (S101:YES), the process proceeds to S104. Note that, at this stage in S101, the abnormality is not yet established.

When it is determined that the abnormality of the main output signal Sm is not yet detected (S101:NO), information indicating that the main output signal Sm is normal is output to the torque calculator 43, and the process proceeds to S102.

In S102, it is considered that the main output signal Sm is normal, and the torque calculator 43 sets the main steering torque Tm calculated based on the sensor signal of the main output signal Sm to the steering torque Tq.

In S103, the torque calculator 43 stores the main steering torque Tm as a main steering torque hold value Tm_h in a memory of the ECU 40 that is not illustrated. In the present embodiment, such a memory may be a random access memory (RAM). In such manner, the main steering torque hold value Tm_h is held, i.e., retained. Since only the latest value of the main steering torque hold value Tm_h needs to be held and used for every calculation, the main steering torque hold value Tm_h may be overwritten every time the main steering torque Tm is newly calculated.

In S104, which is subsequent to a detection of the abnormality of the main output signal Sm (S101:YES), the abnormality detector 42 determines whether the abnormality of the sub output signal Ss is detected.

When the abnormality of the sub output signal Ss is detected (S104:YES), the process after S105 is not performed. That is, the torque calculation is not performed when the abnormality of the main output signal Sm and the abnormality of the sub output signal Ss are detected.

When the abnormality of the main output signal Sm and the sub output signal Ss are established, that is considered as a double fault, and the operation of the electric power steering device 80 is stopped.

During a period from the detection of the double fault to an establishment of the double fault, a previous value of the steering torque Tq is held/retained, for example.

When it is determined that no abnormality of the sub output signal Ss is detected (S104:NO), the sub output signal Ss is considered as normal, and the process proceeds to S105.

In S105, the abnormality detector 42 increments a count value C1 of an abnormality establishment counter concerning an abnormality establishment of the main output signal Sm.

In S106, it is determined by the abnormality detector 42 whether the count value C1 is greater than an abnormality establishment threshold Cth1.

When it is determined that the count value C1 is equal to or less than the abnormality establishment threshold Cth1 (S106:NO), information indicating that it is a transition period from the detection of abnormality in the main output signal Sm to the establishment of the abnormality of the main output signal Sm is output to the torque calculator 43, and the process proceeds to S108.

When it is determined that the count value C1 is greater than the abnormality establishment threshold Cth1 (S106:YES), information indicating that the abnormality of the main output signal Sm is already established is output to the torque calculator 43, and the process proceeds to S107.

In S107, which is subsequent to the establishment of the abnormality of the main output signal Sm, the torque calculator 43 sets the sub steering torque Ts that is calculated based on the sensor signal of the sub output signal Ss to the steering torque Tq.

In S108, which is subsequent to (i) the detection of the abnormality of the main output signal Sm and (ii) the count value C1 determined as being equal to or less than the abnormality establishment threshold Cth1 (S101:YES and S106:NO), the sensor device 1 or the ECU 40 is in the transition period, in which abnormality of the main output signal Sm is not yet established.

The torque calculator 43 calculates the steering torque Tq by an equation (1), based on the main steering torque hold value Tm_h, and the sub steering torque Ts, which are respectively held in the memory. In the equation (1), a term r is a first transition coefficient, and (1−r) is a second transition coefficient. The first transition coefficient r is set as a value of 0<r<1.

$$Tq = Tm\_h \times r + Ts \times (1-r) \quad \text{Equation (1)}$$

According to the present embodiment, in the transition period from the detection of the abnormality in the main output signal Sm to the establishment of the abnormality of the main output signal Sm, the torque calculator 43 calculates the steering torque Tq by using (i) the main steering torque hold value Tm_h that is the main steering torque Tm before the detection of the abnormality, and (ii) the latest sub steering torque Ts. Further, when the abnormality of the main output signal Sm is established, the steering torque Tq is switched to the sub steering torque Ts.

Thereby, in comparison to a direct switching from the steering torque Tq to the sub steering torque Ts, when the abnormality of the main output signal Sm is detected, the fluctuation of the steering torque Tq is reduced.

As described above, the sensor device 1 of the present embodiment is provided with the main sensor 10, the sub sensor 20, and the ECU 40.

The main sensor 10 has the main sensor elements 11 and 12 and the main output circuit 15. The main sensor elements 11 and 12 detect the target physical quantity (in the present embodiment, the magnetic flux of the magnetic flux collector 831). The main output circuit 15 generates and outputs the main output signal Sm including the main sensor signal according to the detection value of the main sensor elements 11 and 12.

The sub sensor 20 has the sub sensor elements 21 and 22 and the sub output circuit 25. The sub sensor elements 21 and 22 detect the target physical quantity. The sub output circuit 25 generates the sub output signal Ss including the sub sensor signal according to the detection value of the sub sensor elements 21 and 22, and outputs the sub output signal Ss at the shifted output timing that is shifted from the output timing of the main output signal Sm by the preset amount, i.e., by the half cycle, or one half of the signal cycle Ps.

The ECU 40 has the signal obtainer 41, the abnormality detector 42, and the torque calculator 43. The signal obtainer 41 obtains the main output signal Sm and the sub output signal Ss. The abnormality detector 42 detects the abnormality of the main output signal Sm and the sub output signal Ss. The torque calculator 43 calculates the steering torque Tq based on at least one of the main sensor signal and the sub sensor signal.

The torque calculator 43 sets the main steering torque Tm calculated based on the main sensor signal to the steering torque Tq, when the main output signal Sm is normal.

In the transition period from the detection of the abnormality of the main output signal Sm to the establishment of the abnormality, the torque calculator 43 calculates the steering torque Tq based on (i) the sub steering torque Ts calculated based on the sub sensor signal and (ii) the main steering torque Tm before the detection of the abnormality.

The sensor device 1 of the present embodiment having a redundancy of the main sensor 10 and the sub sensor 20 is enabled to continue the calculation of the steering torque Tq, even when the abnormality is caused in some detection signals, because the signal obtainer 41 is enabled to obtain both of the main output signal Sm and the sub output signal Ss.

The steering torque Tq in the transition period is calculated based on the sub steering torque Ts and the main steering torque Tm before the detection of abnormality.

Thereby, when the abnormality occurs in some detection signals, the fluctuation of the steering torque Tq accompanying the switching of the calculation to the one that uses the normal signals only is reduced.

When the abnormality of the main output signal Sm is established, the torque calculator 43 sets the sub steering torque Ts to the steering torque Tq, In the present embodiment, the torque calculator 43 calculates the steering torque Tq in the transition period based on (i) the sub sensor torque Ts calculated based on the sub sensor signal, and (ii) the main steering torque Tm before the detection of the abnormality.

Therefore, as compared with a case where the steering torque Tq is directly switched from the main steering torque Tm to the sub steering torque Ts, the fluctuation of the steering torque Tq at the time of the abnormality of the main output signal Sm is reduced.

In the transition period, the torque calculator 43 sets, to the steering torque Tq, the weighted average of the main steering torque Tm and the sub steering torque Ts. More practically, the sum of (i) the main steering torque Tm multiplied by the first transition coefficient r (i.e., 0<r<1) and (ii) the sub steering torque Ts multiplied by the second transition coefficient (1−r) is calculated as the steering torque Tq, which is a comparatively simple calculation.

The main sensor elements 11, 12 and the sub sensor elements 21, 22 are the magnetism detection elements that detect the magnetic flux of the magnetic flux collector 831 as the target physical quantity. Further, the main sensor elements 11, 12 and the sub sensor elements 21, 22 detect the change of the magnetic flux that changes according to the torque.

Thereby, the torque (i.e., in the present embodiment, the steering torque) is appropriately detectable.

Further, the electric power steering device 80 is provided with the sensor device 1, the motor 81, and the speed reduction gear 82. The motor 81 outputs the assist torque for assisting the steering operation of the steering wheel 91 by the driver. The speed reduction gear 82 transmits the torque of the motor 81 to the steering shaft 92 that is a drive object of the motor 81.

The torque calculator 43 calculates the steering torque Tq.

The ECU 40 has the motor controller 45 that controls the drive of the motor 81 based on the steering torque Tq.

Since the ECU 40 has the main sensor 10 and the sub sensor 20, even in case that one of the two sensors 10, 20 has the abnormality caused therein, the ECU 40 can continue the calculation of the steering torque Tq by using the normal one of the two sensors 10, 20. Thereby, the electric power steering device 80 can continue the assistance of the steering operation according to the steering torque Tq.

In the transition period, the torque calculator 43 calculates the steering torque Tq by using (i) the sub steering torque Ts and (ii) the main steering torque Tm before the detection of the abnormality. Thereby, due to the reduction of the fluctuation of the calculated steering torque Tq, the torque variation of the motor 81 is also reduced.

Therefore, since the change of the assist force of the electric power steering device 80 is reduced, the wrong steering feel for the driver of the vehicle is reduced, or prevented.

In the present embodiment, the steering torque Tq corresponds to the "target physical quantity", the main steering torque Tm corresponds to the "main physical quantity", and the sub steering torque Ts corresponds to the "sub physical quantity."

Second Embodiment

Figure 6:
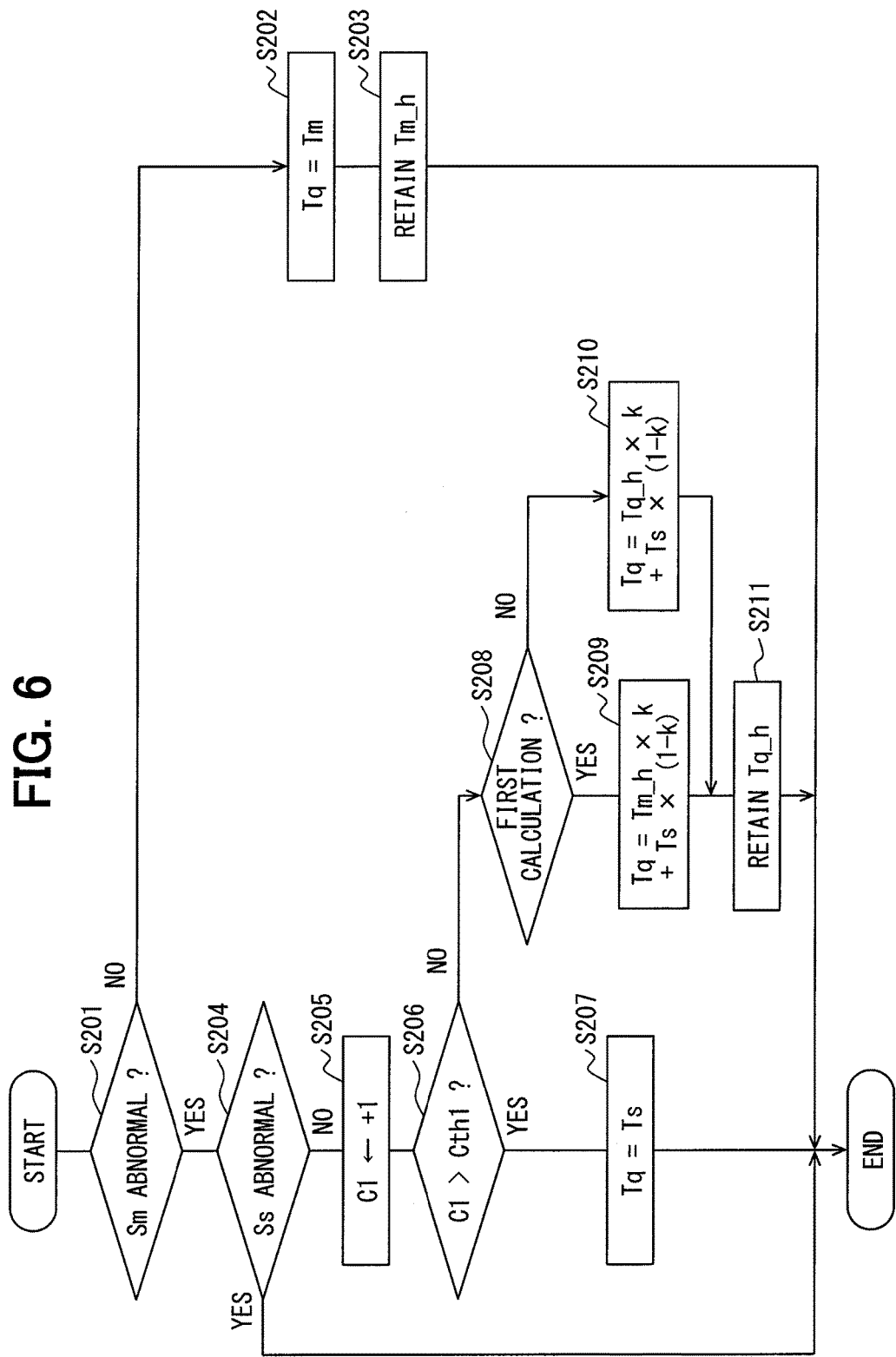
FIG. 6 is a flowchart of the torque calculation process in a second embodiment of the present disclosure.

The second embodiment of the present disclosure is shown in FIG. 6.

Since the torque calculation process in the second embodiment to the fifth embodiment differs from the above-mentioned embodiment, the description in the following embodiments is focusing on such difference of the torque calculation process.

Hereafter, the steering torque Tq calculated by the previous (i.e., immediately-before) calculation is designated as a steering torque Tq(n−1). The torque calculation process of the present embodiment is described based on a flowchart shown in FIG. 6. The calculation cycle and the like are assumed to be the same as the above-mentioned embodiment.

The process of S201-S207 is the same as the process of S101-S107 in FIG. 5.

When the count value C1 is determined to be equal to or less than the abnormality establishment threshold Cth1 in S206 (S206:NO), the process proceeds to S208.

In S208, the abnormality detector 42 determines whether it is the first calculation after the abnormality of the main output signal Sm is detected.

When it is determined that it is not the first calculation (i.e., when the count value C1 is 2 or more and is equal to or less than the abnormality establishment threshold Cth1) (S208:NO), information indicating that it is not the first calculation is output to the torque calculator 43, and the process proceeds to S210.

When it is determined that it is the first calculation (i.e., when the count value C1 is 1) (S208:YES), information indicating that it is the first calculation is output to the torque calculator 43, and the process proceeds to S209.

In S209, the torque calculator 43 calculates the steering torque Tq based on (i) the main steering torque hold value Tm_h, which is the steering torque Tq(n−1) from the previous calculation, and (ii) the sub steering torque Ts (refer to an equation (2)).

A term k in the equation (2) corresponds to the first transition coefficient, and a term (1−k) corresponds to the second transition coefficient.

The first transition coefficient k is suitably set up as a value of 0<k<1.

$$Tq=Tm\_h \times k+Ts \times (1-k) \qquad \text{Equation (2)}$$

In S210, which is subsequent to a determination that the calculation of the torque is the second time or more after the abnormality of the main output signal Sm is detected (S208:NO), the torque calculator 43 calculates the steering torque Tq based on (i) a steering torque hold value Tq_h, which is the steering torque Tq(n−1) from the previous calculation, and (ii) the sub steering torque Ts (refer to an equation (3)).

$$Tq=Tq\_h \times k+Ts \times (1-k) \qquad \text{Equation (3)}$$

In S211, which is subsequent to S209 or S210, the torque calculator 43 memorizes the value calculated by S209 or S210 as the steering torque hold value Tq_h in the memory. Thereby, the steering torque hold value Tq_h is held, i.e., retained.

Since only the latest value of the steering torque hold value Tq_h needs to be held and used for every calculation, the steering torque hold value Tq_h may be overwritten every time the steering torque Tq_h is newly calculated.

In the present embodiment, in the transition period from the detection of the abnormality of the main output signal Sm to the establishment of the abnormality, the process of S208-S211 is performed.

That is, the torque calculator 43 calculates the steering torque Tq in the transition period by using (i) the steering torque Tq(n−1) from the previous calculation, and (ii) the latest sub steering torque Ts.

Thereby, in the transition period, since the steering torque Tq asymptotically converges to the sub steering torque Ts, the fluctuation of the steering torque Tq accompanying the switching of the signal used for the calculation of the steering torque Tq is reduced.

In the present embodiment, as for the first calculation after the detection of the abnormality of the main output signal Sm during the transition period, the torque calculator 43 calculates the steering torque Tq as the sum of the two values, which are (i) the main steering torque Tm before the detection of the abnormality multiplied by the first transition coefficient k and (ii) the latest sub steering torque Ts multiplied by the second transition coefficient (1−k).

The torque calculator 43 sets the steering torque Tq in the second calculation and thereafter in the transition period to the sum of the two values, which are (i) the steering torque hold value Tq_h that is the steering torque Tq(n−1) from the previous calculation multiplied by first transition coefficient k, and (ii) the latest sub steering torque Ts multiplied by the second transition coefficient (1−k).

Note that, when it is assumed that the first calculation after the abnormality detection of the steering torque Tq is performed by using the main steering torque Tm before the detection of abnormality, the calculation of the torque Tq for the second time after the abnormality detection by using the previous value of the steering torque Tq(n−1) is included in a notion that "the target physical quantity is calculated based on the main physical quantity prior to the detection of abnormality in the main output signal."

Thereby, since the steering torque Tq in the transition period is asymptotically converged to the sub steering torque Ts, the fluctuation of the steering torque Tq is reduced.

Further, the same effects as the above-mentioned embodiment are achieved.

Third Embodiment

Figure 7:
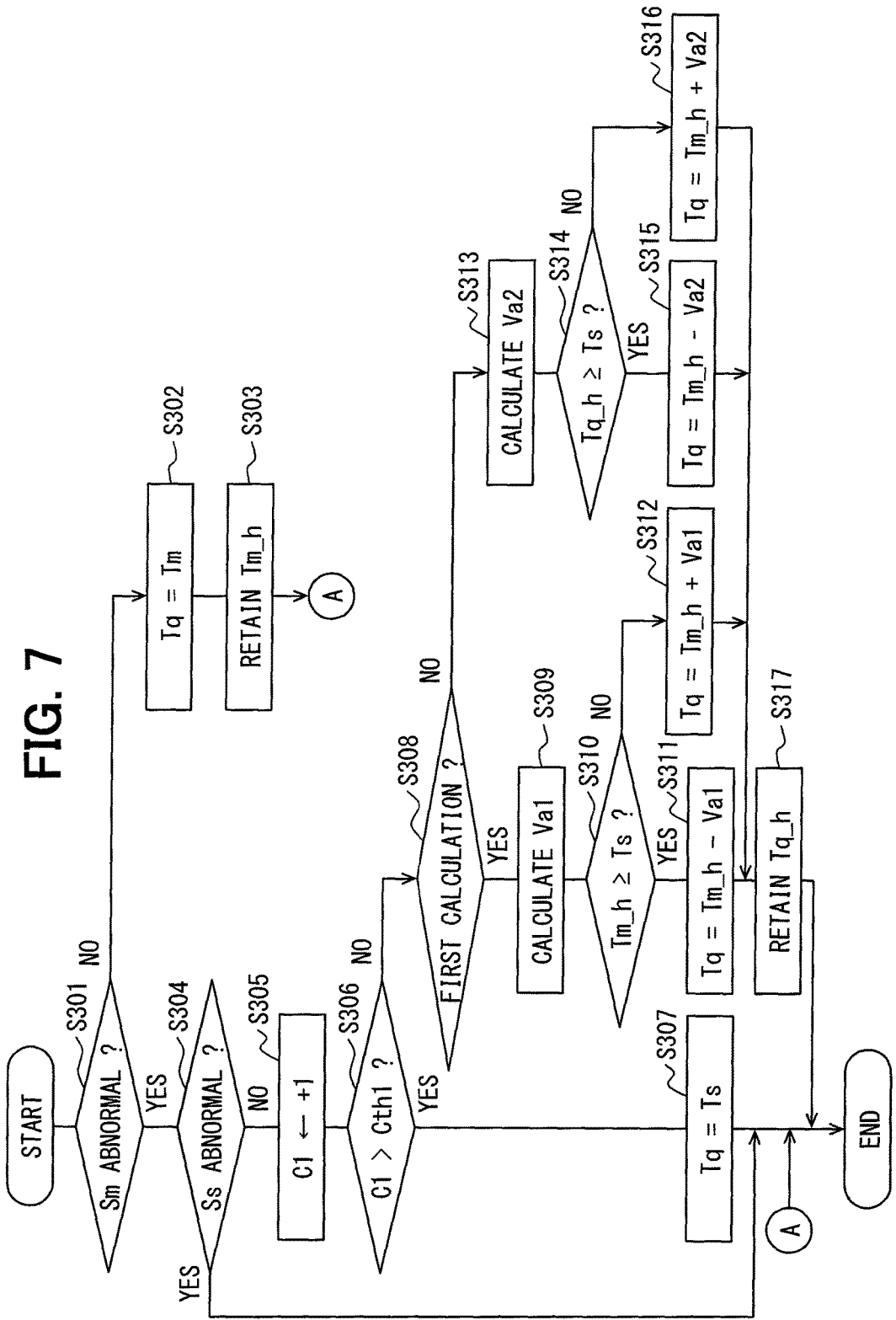
FIG. 7 is a flowchart of the torque calculation process in a third embodiment of the present disclosure.

The torque calculation process in the third embodiment of the present disclosure is described based on a flowchart shown in FIG. 7.

The process of S301-S307 is the same as the process of S101-S107 in FIG. 5.

When the count value C1 is determined to be equal to or less than the abnormality establishment threshold Cth1 in S306 (S306:NO), the process proceeds to S308.

In S308, the abnormality detector 42 determines whether it is the first calculation after the abnormality of the main output signal Sm is detected just like S208.

When it is determined that it is not the first calculation (i.e., when the count value C1 is 2 or more and is equal to or less than the abnormality establishment threshold Cth1) (S308:NO), information indicating that it is not the first calculation is output to the torque calculator 43, and the process proceeds to S313.

When it is determined that it is the first calculation (i.e., when the count value C1 is 1) (S308:YES), information indicating that it is the first calculation is output to the torque calculator 43, and the process proceeds to S309.

In S309, the torque calculator 43 calculates a first transition asymptotic value Va1 (refer to an equation (4)).

The first transition asymptotic value Va1 is a value based on a difference value between the main steering torque hold value Tm_h, which is the steering torque Tq(n−1) from the previous calculation, and the sub steering torque Ts. Further, a term z1 in the equations (4) and (7) is a value of 0<z1<1.

$$Va1=|Tm\_h-Ts|\times z1 \qquad \text{Equation (4)}$$

In S310, the torque calculator 43 determines whether the main steering torque hold value Tm_h is greater than the sub steering torque Ts.

When it is determined that the main steering torque hold value Tm_h is equal to or greater than the sub steering torque Ts (S310:YES), the process proceeds to S311. When it is determined that the main steering torque hold value Tm_h is smaller than the sub steering torque Ts (S310:NO), the process proceeds to S312.

In S311, the torque calculator 43 sets a subtraction value, i.e., a subtraction of the first transition asymptotic value Va1 from the main steering torque hold value Tm_h, to the steering torque Tq (refer to an equation (5)).

$$Tq=Tm\_h-Va1 \qquad \text{Equation (5)}$$

In S312, the torque calculator 43 sets an addition value, i.e., an addition of the first transition asymptotic value Va1 to the main steering torque hold value Tm_h, to the steering torque Tq (refer to an equation (6)).

$$Tq=Tm\_h+Va1 \qquad \text{Equation (6)}$$

In S313, which is subsequent to a determination that it is not the first calculation (S308:NO), the torque calculator 43 calculates a transition asymptotic value Va2 (refer to equation (7)).

The transition asymptotic value Va2 is a value based on a difference value between the steering torque hold value Tq_h, which is the steering torque Tq(n−1) from the previous calculation, and the sub steering torque Ts.

$$Va2=|Tq\_h-Ts|\times z1 \qquad \text{Equation (7)}$$

In S314, the torque calculator 43 determines whether the steering torque hold value Tq_h is equal to or greater than the sub steering torque Ts.

When it is determined that the steering torque hold value Tq_h is equal to or greater than the sub steering torque Ts (S314:YES), the process proceeds to S315. When it is determined that the steering torque hold value Tq_h is smaller than the sub steering torque Ts (S314:NO), the process proceeds to S316.

In S315, the torque calculator 43 sets a subtraction value, i.e., a subtraction of the transition asymptotic value Va2 from the steering torque hold value Tq_h, to the steering torque Tq (refer to an equation (8)).

$$Tq=Tq\_h-Va2 \qquad \text{Equation (8)}$$

In S316, the torque calculator 43 sets an addition value, i.e., an addition of the transition asymptotic value Va2 to the steering torque hold value Tq_h, to the steering torque Tq (refer to an equation (9)).

$$Tq=Tq\_h+Va2 \qquad \text{Equation (9)}$$

In S317, which is subsequent to S311, S312, S315, or S316, the torque calculator 43 memorizes a value calculated in S311, S312, S315, or S316 to the memory as the steering torque hold value Tq_h. Thereby, the steering torque hold value Tq_h is held, i.e., retained.

In the present embodiment, in the transition period from the detection of abnormality in the main output signal Sm to the establishment of abnormality of the signal Sm, the process of S308-S317 is performed. That is, the torque calculator 43 calculates the asymptotic values Va1 and Va2 based on the difference value between (i) the steering torque Tq(n−1) from the previous calculation and (ii) the latest sub steering torque Ts.

When the latest sub steering torque Ts is smaller than the steering torque Tq(n−1) from the previous calculation, the asymptotic values Va1 and Va2 are subtracted from the steering torque Tq(n−1) from the previous calculation, and, when the latest sub steering torque Ts is equal to or greater than the steering torque Tq(n−1) from the previous calculation, the asymptotic values Va1 and Va2 are added to the steering torque Tq(n−1) from the previous calculation. In other words, depending on which is greater than which among the steering torque Tq(n−1) from the previous calculation, and the sub steering torque Ts, whether to add or subtract one from the other is determined.

Thereby, in the transition period, since the steering torque Tq asymptotically converges to the sub steering torque Ts, the fluctuation of the steering torque Tq accompanying the switching of the signal used for the calculation of the steering torque Tq is reduced.

In the present embodiment, as for the first calculation after the detection of the abnormality of the main output signal Sm during the transition period, the first transition asymptotic value Va1 is calculated based on the difference value between the main steering torque Tm before the detection of the abnormality and the latest sub steering torque Ts, and the steering torque Tq is calculated by using the first transition asymptotic value Va1 concerned. More practically, the steering torque Tq is calculated based on (i) the main steering torque hold value Tm_h that is the main steering torque Tm before the detection of the abnormality and (ii) the first transition asymptotic value Va1.

Further, in the second and subsequent calculations during the transition period, the torque calculator 43 calculates the transition asymptotic value Va2 based on the difference value between the steering torque Tq from the previous calculation and the latest sub steering torque Ts, and calculates the steering torque Tq by using the transition asymptotic value Va2 concerned. More practically, the steering torque Tq is calculated based on (i) the steering torque hold value Tq_h that is steering torque Tq(n−1) from the previous calculation, and (ii) the transition asymptotic value Va2.

Thereby, since the steering torque Tq in the transition period asymptotically converges to the sub steering torque Ts, the fluctuation of the steering torque Tq is reduced.

Further, the same effects as the above-mentioned embodiments are achieved.

Fourth Embodiment

Figure 8:
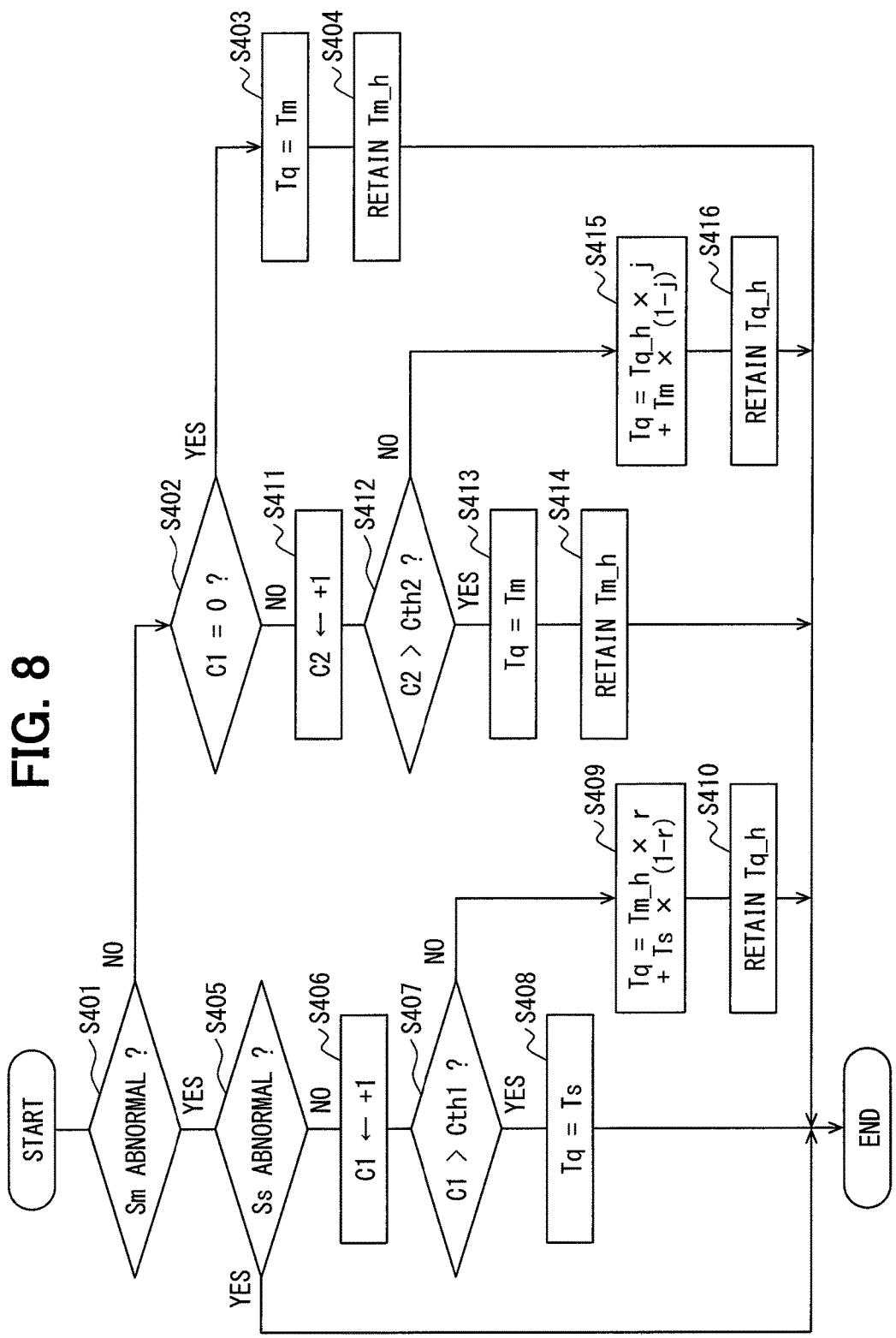
FIG. 8 is a flowchart of the torque calculation process in a fourth embodiment of the present disclosure.

The torque calculation process in the fourth embodiment of the present disclosure is described based on a flowchart in FIG. 8.

The process of S401 is the same as the process of S101 in FIG. 5. When affirmatively determined in S401 (YES in S401), a count value C2 of a below-mentioned normal return counter is reset.

In S402, the abnormality detector 42 determines whether the count value C1 of the abnormality establishment counter is 0. When the count value C1 is determined as not to be equal to 0 (S402:NO), the process proceeds to S411. When the count value C1 is determined to be equal to 0 (S402:YES), the process proceeds to S403.

The process of S403-S409 is the same as the process of S102-S108. In FIG. 8, just like the first embodiment, the steering toque Tq in the transition period is calculated by the equation (1). However, the steering torque Tq may also be calculated as shown in the second embodiment, i.e., S208-S210 of the second embodiment, or may also be calculated as shown in the third embodiment, i.e., S308-S316 of the third embodiment.

In S410, the torque calculator 43 memorizes the calculated steering torque Tq in the memory as the steering torque hold value Tq_h.

In S411, which is subsequent to a series of determinations, i.e., when the abnormality of the main output signal Sm is not detected and the count value C1 of the abnormality establishment counter is not equal to 0 (S401 NO and S402:NO), the abnormality detector 42 increments the count value C2 of the normal return counter.

In S412, the abnormality detector 42 determines whether the count value C2 is greater than a return completion threshold Cth2.

When the count value C2 is determined as less than the return completion threshold Cth2 (S412:NO), information indicating that it is in a normal return wait period is output to the torque calculator 43, and the process proceeds to S415.

When it is determined that the count value C2 is equal to or greater than the return completion threshold Cth2, information of a normal return completion is output to the torque calculator 43, and the process proceeds to S413.

In S413, it is considered that the main output signal Sm has returned to normal, even though the abnormality of the main output signal Sm has been detected temporarily, since, after the temporal abnormality, the main output signal Sm stays, i.e., continues to be, normal at least for the normal return wait period. Then, the torque calculator 43 sets the main steering torque Tm to the steering torque Tq. Further, the torque calculator 43 resets the count values C1 and C2.

In S414, just like the S404, the torque calculator 43 memorizes the calculated main steering torque Tm_h in the memory as the main steering torque hold value Tm_h. Thereby, the main steering torque hold value Tm_h is held, i.e., retained.

In S415, which is subsequent to a determination that the count value C2 is determined to be equal to or less than the return completion threshold Cth2 (S412:NO), the torque calculator 43 calculates the steering torque Tq based on (i) the steering torque hold value Tq_h, which is the steering torque Tq(n−1) from the previous calculation, and (ii) the main steering torque Tm (refer to an equation (10)). A term j in the equation (10) corresponds to a first normal return coefficient, and a term (1−j) corresponds to a second normal return coefficient. The first normal return coefficient j is set up as a value of $0 < j < 1$.

$$Tq = Tq\_h \times j + Tm \times (1-j) \qquad \text{Equation (10)}$$

In S416, the torque calculator 43 memorizes the value calculated by S414 in the memory as the steering torque hold value Tq_h. Thereby, the steering torque hold value Tq_h is held, i.e., retained.

In the present embodiment, in the normal return wait period, the process of S411-S416 is performed. That is, in the course of returning to normal after the detection of temporary abnormality in the main output signal Sm and resolution of, i.e., a recovery from, such temporal abnormality, the torque calculator 43 in the normal return wait period calculates the steering torque Tq by using the steering torque hold value Tq_h that is the steering torque Tq(n−1) from the previous calculation and the main steering torque Tm. Thereby, when returning to normal, as compared with a case where the switching of the signal is performed directly to the main steering torque Tm from the steering torque Tq calculated by using the sub steering torque Ts, the fluctuation of the steering torque Tq is reduced.

In the present embodiment, when the main output signal Sm becomes normal after the abnormality of the main output signal Sm is detected, in the normal return wait period during which the returning to normal is established, the torque calculator 43 calculates the steering torque Tq as an addition of two values, i.e., an addition of (i) the steering torque Tq(n−1) from the previous calculation multiplied by the first normal return coefficient j, and (ii) the latest main steering torque Tm multiplied by the second normal return coefficient (1−j). Thereby, in a normal return wait period, the steering torque Tq is asymptotically converged to the main steering torque Tm, and the fluctuation of the steering torque Tq at the time of returning to normal is reduced.

Further, the same effects as the above-mentioned embodiments are achieved.

Fifth Embodiment

Figure 9:
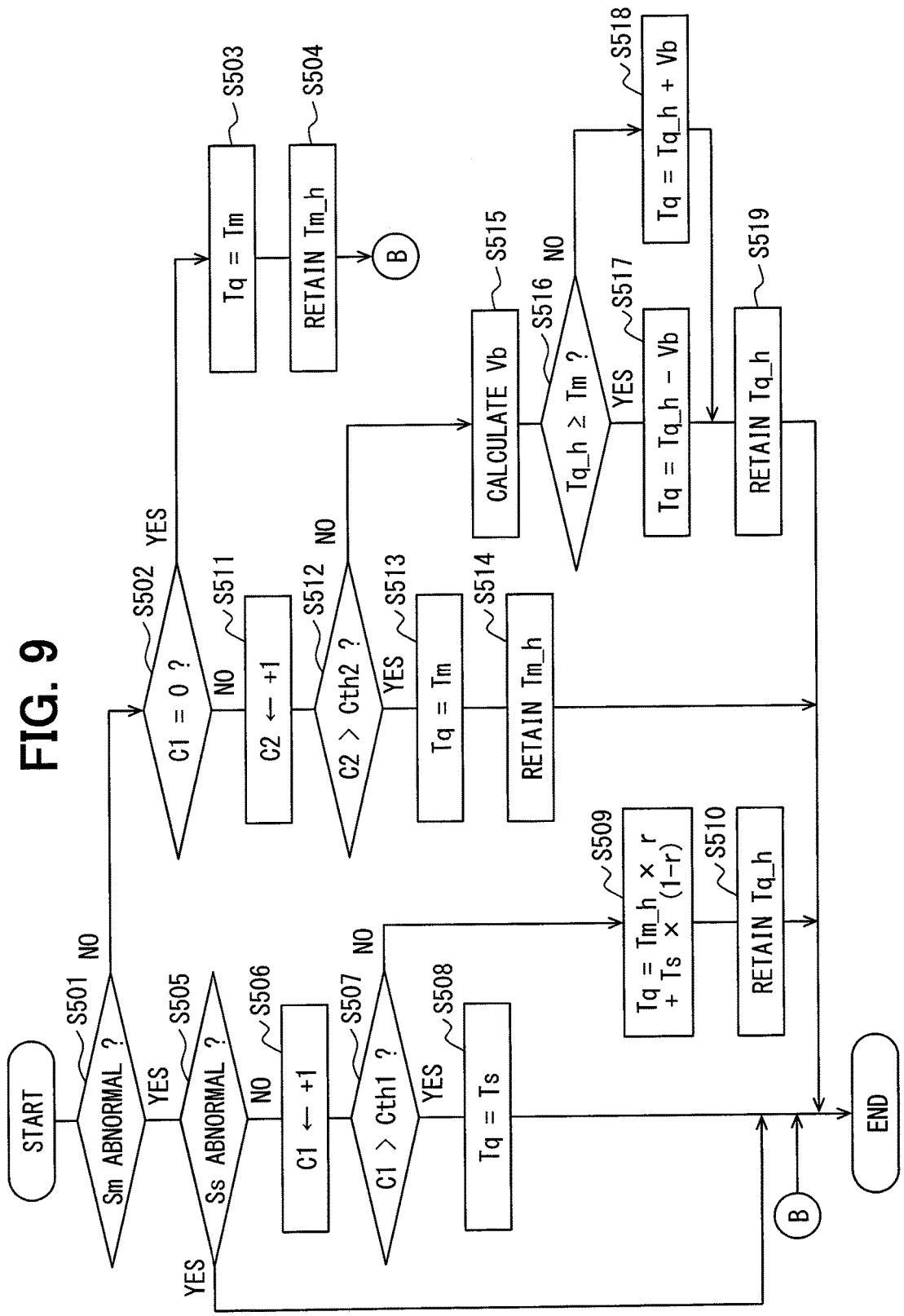
FIG. 9 is a flowchart of the torque calculation process in a fifth embodiment of the present disclosure.

The torque calculation process in the fifth embodiment of the present disclosure is described based on a flowchart in FIG. 9.

The process of S501-S514 is the same as the process of S401-S414 in FIG. 8.

In S512, when the count value C2 is determined to equal to or less than the return completion threshold Cth2 (S512: NO), the process proceeds to S515.

In S515, the torque calculator 43 calculates a normal return asymptotic value Vb (refer to an equation (11)). The normal return asymptotic value Vb is a value based on a difference value between the steering torque hold value Tq_h, which is the steering torque Tq(n−1) from the previous calculation, and the main steering torque Tm. A term z2 in the equation (11) is set to a value of 0<z2<1.

$$Vb=|Tq\_h-Tm|\times z2 \qquad \text{Equation (11)}$$

In S516, the torque calculator 43 determines whether the steering torque hold value Tq_h that is the steering torque Tq(n−1) from the previous calculation is equal to or greater than the main steering torque Tm.

When it is determined that the steering torque hold value Tq_h is equal to or greater than the main steering torque Tm (S516:YES), the process proceeds to S517.

When it is determined that the steering torque hold value Tq_h is smaller than the main steering torque Tm (S516: NO), the process proceeds to S518.

In S517, the torque calculator 43 sets a subtraction value, i.e., the normal return asymptotic value Vb subtracted from the steering torque hold value Tq_h, to the steering torque Tq (refer to an equation (12)).

$$Tq=Tq\_h-Vb \qquad \text{Equation (12)}$$

In S518, the torque calculator 43 sets an addition value, i.e., the normal return asymptotic value Vb added to the steering torque hold value Tq_h, to the steering torque Tq (refer to an equation (13)).

$$Tq=Tq\_h+Vb \qquad \text{Equation (13)}$$

In S519, which is subsequent to S517 or S518, the value calculated by S517 or S518 is memorized in the memory as the steering torque hold value Tq_h. Thereby, the steering torque hold value Tq_h is held, i.e., retained.

In the present embodiment, in the normal return wait period, the process of S515-S519 is performed. That is, the torque calculator 43 calculates the normal return asymptotic value Vb based on the difference value between the steering torque Tq(n−1) from the previous calculation and the latest main steering torque Tm. Then, when the latest main steering torque Tm is smaller than the steering torque Tq(n−1) from the previous calculation, the normal return asymptotic value Vb is subtracted from the steering torque Tq(n−1) from the previous calculation, and, when the latest main steering torque Tm is equal to or greater than the steering torque Tq(n−1) from the previous calculation, the normal return asymptotic value Vb is added to the steering torque Tq(n−1) from the previous calculation. In other words, depending on which is greater than which among the main steering torque Tm and the steering torque Tq(n−1) from the previous calculation, whether to add or subtract the normal return asymptotic value Vb to/from the steering torque Tq(n−1) from the previous calculation is determined.

Thereby, in the normal return wait period, since the steering torque Tq is asymptotically converged to the main steering torque Tm, the fluctuation of the steering torque Tq accompanying the switching of the signal used for the calculation of the steering torque Tq is reduced.

In the present embodiment, in case that the main output signal Sm becomes normal after the abnormality of the main output signal Sm is detected, during the normal return wait period until the normal return is established, the torque calculator 43 calculates the normal return asymptotic value Vb based on the difference value between the steering torque Tq(n−1) from the previous calculation and the latest main steering torque Tm, and the steering torque Tq is calculated by using the normal return asymptotic value Vb concerned. More practically, the torque calculator 43 calculates the steering torque Tq based on (i) the steering torque hold value Tq_h, which is the steering torque Tq(n−1) from the previous calculation and (ii) the normal return asymptotic value Vb. Thereby, in the normal return wait period, the steering torque Tq is asymptotically converged to the main steering torque Tm, and the fluctuation of the steering torque Tq at the time of returning to normal is reduced.

Further, the same effects as the above-mentioned embodiments are also achieved.

Sixth Embodiment

Figure 10:
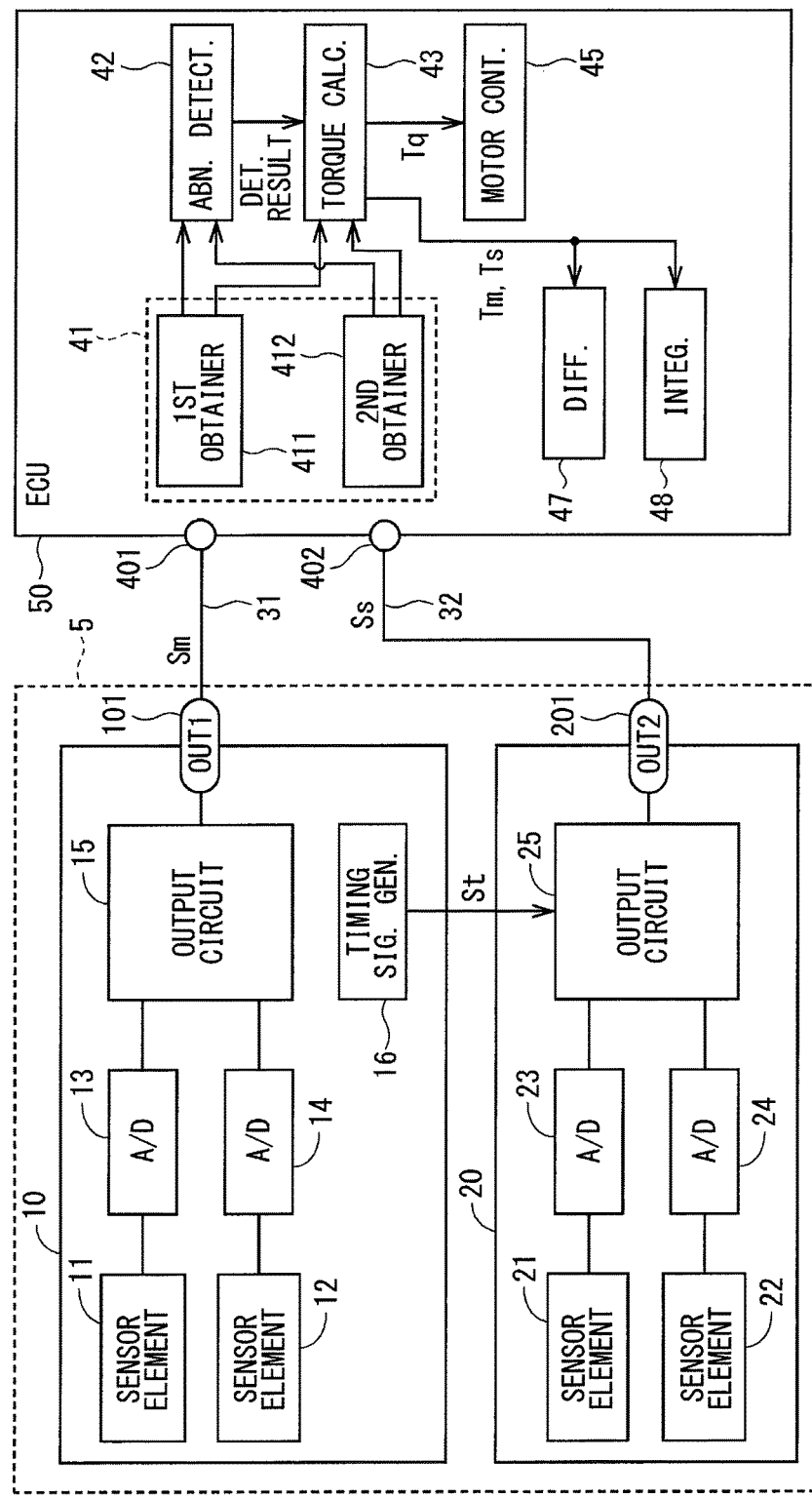
FIG. 10 is a block diagram of the sensor device in a sixth embodiment of the present disclosure.

The sixth embodiment of the present disclosure is described based on FIG. 10.

As shown in FIG. 10, a sensor device 2 of the present embodiment is provided with the sensor unit 5 and an ECU 50 that serves as a controller.

In addition to having the signal obtainer 41, the abnormality detector 42, the torque calculator 43 serving as a physical quantity calculator, and the motor controller 45, the ECU 50 has a differentiator 47 and an integrator 48.

The differentiator 47 and the integrator 48 obtain the main steering torque Tm and the sub steering torque Ts from the torque calculator 43.

The differentiator 47 calculates a main differential value dTm that is a differential value of the main steering torque Tm, and a sub differential value dTs that is a differential value of the sub steering torque Ts.

When a current value of the main steering torque Tm is designated as Tm(n) and a previous value is designated as Tm(n−1), the main differential value dTm is calculated by an equation (14).

$$dTm=\{Tm(n)-Tm(n-1)\}/Ps \qquad \text{Equation (14)}$$

When the current value of the sub steering torque Ts is designated as Ts(n) and the previous value is designated as Ts(n−1), the sub differential value dTs is calculated by an equation (15).

$$dTs=\{Ts(n)-Ts(n-1)\}/Ps \qquad \text{Equation (15)}$$

When the main output signal Sm is normal, the differentiator 47 sets the main differential value dTm to the torque differential value dTq, and retains the main differential value dTm in the memory. Note that, while the main output signal Sm is normal, the calculation of the sub differential value dTs may be skipped.

When the abnormality of the main output signal Sm is established, the torque differential value dTq is switched to the sub differential value dTs. Further, during the transition period after the detection of abnormality of the main output signal Sm until the establishment of the abnormality, the torque differential value dTq is calculated based on the main differential value dTm and the latest sub differential value dTs before the detection of the abnormality is detected.

The integrator 48 calculates a main integral value iTm that is an integral value of the main steering torque Tm, and a sub integral value iTs that is an integral value of the sub steering torque is.

The main integral value iTm and the sub integral value iTs are calculated by equations (16) and (17).

$$iTm = \{Tm(n) + Tm(n-1)\} \times Ps \qquad \text{Equation (16)}$$

$$iTs = \{Ts(n) + Ts(n-1)\} \times Ps \qquad \text{Equation (17)}$$

When the main output signal Sm is normal, the integrator 48 sets the main integral value iTm to a torque integral value iTq, and retains the main integral value iTm in the memory. Note that, while the main output signal Sm is normal, the calculation of the sub integral value iTs may be skipped.

When the abnormality of the main output signal Sm is established, the torque integral value iTq is switched to the sub integral value iTs. Further, during the transition period after the detection of the abnormality of the main output signal Sm until the establishment of the abnormality, the torque integral value iTq is calculated based on the main integral value iTm and the latest sub integral value iTs before the detection of the abnormality.

The torque differential value dTq and the torque integral value iTq calculated in the above-described manner are usable in various calculations besides the calculation in the motor controller 45.

By replacing the main steering torque Tm of the above-mentioned embodiments with the main differential value dTm, and by replacing the sub steering torque Ts with the sub differential value dTs, the torque differential value dTq instead of the steering torque Tq is calculable, just like the above-mentioned embodiments.

Further, by replacing the main steering torque Tm of the above-mentioned embodiments with the main integral value iTm, and by replacing the sub steering torque Ts with the sub integral value iTs, the torque integral value iTq instead of the steering torque Tq is calculable, just like the above-mentioned embodiments.

When the abnormality of the main output signal Sm is detected, in a configuration in which the previous steering toque T(n−1) is retained as the steering torque Tq, the difference between the previous value and the current value becomes 0, thereby causing the torque differential value dTq to be equal to 0. For example, in a configuration in which the steering torque Tq is calculated as (i) the main steering torque when the main output signal Sm is normal, or as (ii) the steering torque Tq(n−1) from the previous calculation in the transition period, or as (iii) the sub steering torque after the establishment of the abnormality, the differential value in the transition period is equal to 0, the torque differential value dTq may steeply change before and after the transition period.

In the present embodiment, since the differentiator 47 calculates the torque differential value dTq in the transition period by using the main differential value dTm and the sub differential value dTs before the detection of the abnormality, the torque differential value dTq in the transition period does not become zero, thereby reducing the fluctuation of the torque differential value dTq before and after the transition period. Further, as compared with a case where the main differential value dTm is directly switched to the sub differential value dTs or similar cases, the fluctuation of the torque differential value dTq is reduced more efficiently.

In a configuration in which the steering torque Tq(n−1) from the previous calculation is held, i.e., retained, as the steering torque Tq, since the torque integral value iTq in the transition period is constant, the torque integral value iTq may possibly fluctuate steeply before and after the transition period.

However, in the present embodiment, during the transition period, since the torque integral value iTq is calculated by using the main integral value iTm and the sub integral value iTs at the normal time, the torque integral value iTq in the transition period does not take a constant value, thereby reducing the fluctuation of the torque integral value iTq in the transition period.

Further, as compared with a case where the main integral value iTm is directly switched to the sub integral value iTs or similar cases, the fluctuation of the torque integral value iTq is reduced.

Further, the differentiator 47 may calculate the torque differential value dTq in the normal return wait period in a manner that is same as the fifth embodiment, i.e., by using the previous value dTq(n−1) and the main differential value dTm. Thereby, the steep change of the torque differential value dTq in a course of returning to normal is reduced.

Similarly, the integrator 48 may calculate the torque integral value iTq in the normal return wait period by using the previous value iTq(n−1) and the main integral value iTm. Thereby, the fluctuation of the torque integral value iTq in a period of returning to normal is reduced.

The ECU 50 has the differentiator 47 that calculates the torque differential value dTq that is the differential value of the steering torque Tq. The differentiator 47 sets the main differential value dTm that is the differential value of the main steering torque Tm to the torque differential value dTq, when the main output signal Sm is normal. Further, the differentiator 47 calculates the torque differential value dTq in the transition period based on the sub steering torque Ts and the main steering torque Tm before the detection of the abnormality. Note that the calculation of the torque differential value dTq based on the sub differential value dTs and the main differential value dTm before the detection of the abnormality is included in a notion of "calculating the differential value of the target physical quantity based on the sub physical quantity and the main physical quantity before the detection of the abnormality." Thereby, the fluctuation of the torque differential value dTq accompanying the switching to the calculation by using the normal signal is reduced.

The ECU 50 has the integrator 48 that calculates the torque integral value iTq that is the integral value of the steering torque Tq.

The integrator 48 sets the main integral value iTm that is the integral value of the main steering torque Tm to the torque integral value iTq, when the main output signal Sm is normal. Further, the integrator 48 calculates the torque integral value in the transition period based on the sub steering torque Ts and the main steering torque Tm before the detection of the abnormality. Note that the calculation of the torque integral value iTq based on the sub integral value iTs and the main integral value iTm before the detection of the abnormality is included in a notion of "calculating the integral value of the target physical quantity based on the sub physical quantity and the main physical quantity before the detection of the abnormality." Thereby, the fluctuation of the torque integral value iTq accompanying the switching to the calculation by using the normal signal is reduced.

Further, the same effects as the above-mentioned embodiment are achieved.

Other Embodiments (a) Main Sensor and Sub Sensor

In the above-mentioned embodiments, one main sensor and one sub sensor are provided in the sensor device. However, in other embodiments, the number of at least one of the main sensor and the sub sensor may be two or more in the sensor device.

In the above-mentioned embodiment, the main sensor and the sub sensor part are provided independently in different bodies. However, in other embodiments, the main sensor and the sub sensor may be sealed by one sealed part, and may be enclosed in one package.

In the above-mentioned embodiment, the two sensor elements are provided in the main sensor and the sub sensor. However, in other embodiments, the number of the sensor elements provided in the main sensor may be one, or may be three or more. The same applies to the sub sensor. Further, the number of the sensor elements in the main sensor may be different from the number of the sensor elements in the sub sensor.

In the above-mentioned embodiment, the sensor element is the Hall element. However, in other embodiments, the sensor elements may be a magnetism detection element other than the Hall element, and may even be an element which detects a physical quantity other than the magnetism.

Further, in the above-mentioned embodiment, the main sensor and the sub sensor are used as the torque sensor which detects the steering torque. However, in other embodiments, the sensor part may detect any kind of physical quantity, e.g., a torque other than the steering torque, a rotation angle, a stroke, a load, a pressure or the like.

(b) Output Signal

In the above-mentioned embodiment, the main output circuit outputs the main output signal to the controller by the SENT communication. However, in other embodiments, the main output circuit may output the main output signal to the controller by the digital communication method other than the SENT communication. Further, the main output circuit may output the main output signal to the controller by an analog communication. The same applies to the sub output circuit.

In the above-mentioned embodiment, the sub output signal is output at a shifted output timing, which is shifted from the output timing of the main output signal by an amount of half signal cycle. However, in other embodiments, the amount of shift of the output timing between the main output signal and the sub output signal may be any amount, as long as the amount of the shift is shorter than the one signal cycle. Further, the output signals (i.e., the main or sub output signal) of three kinds or more may be shifted from other output signals by the equal shift amount that is equal to a division of the signal cycle by the kinds of the output signal, the controller receives the output signals at equal intervals thereby an on-appearance communication speed is improved.

Further, the predetermined amount of shift between the output timings of the main and sub output signals may be decreased substantially to zero, for the simultaneous output of the main and sub output signals.

In the above-mentioned embodiment, the timing signal generation circuit is provided in the main sensor. However, in other embodiments, the timing signal generation circuit may be provided in the sub sensor, and the timing signal generation circuit may be dispensed with, and the main sensor and the sub sensor may output the output signal to the controller at their own timings.

Further, a request signal output part may be provided in the controller, and the main output signal and the sub output signal may be output according to a request signal output from the request signal output part. In such manner, the controller is enabled to obtain the main output signal and the sub output signal at desired timings.

(c) Controller

In the above-mentioned embodiment, the physical quantity calculator is the torque calculator, which calculates a steering torque, and calculates the steering torque by using either one of the main steering torque and the sub steering torque. However, in other embodiments, the target physical quantity, the main physical quantity, and the sub physical quantity may be considered as a voltage value output from the sensor element, and the voltage value calculated as the target physical quantity may be converted to have the torque value.

The target physical quantity, the main physical quantity, and the sub physical quantity may be a physical quantity other than the torque.

In the above-mentioned embodiment, the torque calculator performs the torque calculation process at the timing of obtaining the main output signal. However, in other embodiments, the torque calculator may perform the torque calculation process at different timings from the above, i.e., at the timing of obtaining the sub output signal, for example. Further, the calculation cycle of the torque calculation process may differ from the signal cycle.

In the second embodiment, in the first calculation after the detection of the abnormality in the main output signal, the steering torque is calculated based on the main steering torque hold value that comes from the previous calculation of the steering torque and the latest sub steering torque. However, in other embodiments, the main steering torque from multiple times of calculation may be held, i.e., retained, as the main steering torque hold value in the memory, and the steering torque may be calculated based on (i) the main steering torque from a prior-to-previous calculation, i.e., the calculation before the previous one by two cycles or more, and (ii) the latest sub steering torque, for example.

That is, not only the main physical quantity in the calculation just before the detection of the abnormality in the main output signal, but also the main physical quantity from the calculation in a "further-before cycle of calculation" may be used for the calculation of the target physical quantity as the "main physical quantity before the detection of the abnormality."

The same applies to the third embodiment.

In the third embodiment, the absolute value of the difference value between (i) the main steering torque hold value or the steering torque hold value (it is hereafter assumed as the "previous value"), and (ii) the sub steering torque is multiplied by the predetermined coefficient for the calculation of the asymptotic value. Depending on which is greater than which, the asymptotic value is either added to or subtracted from the previous value. However, in other embodiments, a subtraction value by subtracting the sub steering torque from the previous value may be multiplied by the predetermined coefficient for the calculation of the asymptotic value, and, regardless of which is greater than which, the asymptotic value may always be subtracted from the previous value.

In yet other embodiments, a value of subtracting the asymptotic value from the previous value may be multiplied by the predetermine coefficient for the calculation of the asymptotic value, and the asymptotic value may always be added to the previous value, regardless of which is greater than which.

The same applies to the calculation by using the normal return asymptotic value in the fifth embodiment.

In the sixth embodiment, the differential value of the target physical quantity is calculated based on at least one of the differential value of the main physical quantity and the differential value of the sub physical quantity. However, in other embodiments, the differential value of the target physical quantity may be calculated by differentiating the target physical quantity in one of the first embodiment to the fifth embodiment. Similarly, the integral value of the target physical quantity may be calculated by integrating the target physical quantity calculated in one of the first embodiment to the fifth embodiment.

(d) Sensor Device

In the above-mentioned embodiment, the sensor device is applied to the torque sensor of the electric power steering device. However, in other embodiments, the sensor device may be applied to any in-vehicle device other than the electric power steering device, and may also be applied to a device that is not disposed in a vehicle.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A sensor device comprising:
a main sensor including (i) a main sensor element for detecting a physical quantity of a detection object and (ii) a main output circuit for generating and outputting a main output signal that includes a main sensor signal corresponding to a detection value of the main sensor element;
a sub sensor including (i) a sub sensor element for detecting a physical quantity of the detection object and (ii) a sub output circuit for outputting a sub output signal that includes a sub sensor signal corresponding to a detection value of the sub sensor element, a timing of output of the sub output signal shifted from a timing of output of the main output signal by an amount shorter than one signal cycle; and
a controller including:
a signal obtainer for obtaining the main output signal and the sub output signal;
an abnormality detector for detecting an abnormality of the main output signal and the sub output signal; and
a physical quantity calculator for calculating a target physical quantity by using at least one of the main sensor signal and the sub sensor signal,
wherein
the physical quantity calculator uses a main physical quantity that is calculated based on the main sensor signal as the target physical quantity, when the main output signal is normal, and
the physical quantity calculator calculates the target physical quantity, during a transition period from a detection of the abnormality in the main output signal to an establishment of the abnormality of the main output signal, based on both of (i) a sub physical quantity that is calculated based on the sub sensor signal, and (ii) the main physical quantity generated before the detection of the abnormality in the main output signal.

2. The sensor device of claim 1, wherein
the physical quantity calculator sets the sub physical quantity as the target physical quantity, when the abnormality of the main output signal is established.

3. The sensor device of claim 1, wherein
the physical quantity calculator sets, as the target physical quantity, a physical quantity that is calculated as a weighted average of the main physical quantity and the sub physical quantity, during the transition period, the weighted average calculated as a sum of (i) the main physical quantity before the abnormality detection, and multiplied by a first transition coefficient between 0 and 1 and (ii) the sub physical quantity from a latest detection and multiplied by a second physical quantity derived by subtracting the first transition coefficient from 1.

4. The sensor device of claim 1, wherein
during the transition period,
(a) the physical quantity calculator sets, as the target physical quantity for a first calculation after the detection of abnormality in the main output signal, a physical quantity that is calculated as a weighted average of the main physical quantity and the sub physical quantity, the weighted average calculated as a sum of (i) the main physical quantity before the abnormality detection that is multiplied by a first transition coefficient having a value between 0 and 1, and (ii) the sub physical quantity from a latest detection that is multiplied by a second transition coefficient derived by subtracting the first transition coefficient from 1, and
(b) the physical quantity calculator sets, as the target physical quantity for subsequent calculations after the first calculation, a physical quantity that is calculated as a weighted average of the target physical quantity and the sub physical quantity, the weighted average calculated as a sum of (i) the target physical quantity from a previous calculation that is multiplied by the first transition coefficient, and (ii) the sub physical quantity from a latest detection that is multiplied by the second transition coefficient.

5. The sensor device of claim 1, wherein
during the transition period,
(a) the physical quantity calculator sets, as the target physical quantity for a first calculation after the detection of the abnormality of the main output signal, a first transition asymptotic value that is calculated based on a difference between (i) the main physical quantity of before the abnormality detection, and (ii) the sub physical quantity from a latest detection, and
(b) the physical quantity calculator sets, as the target physical quantity for subsequent calculations after the first calculation, a transition asymptotic value that is calculated based on a difference between (i) the target physical quantity of previous calculation, and (ii) the sub physical quantity from a latest detection.

6. The sensor device of claim 1, wherein
during a normal return wait period from the detection of the abnormality in the main output signal, to an establishment of normal return of the main output signal to a normal state,
the physical quantity calculator calculates the target physical quantity as a sum of (i) the target physical quantity from a previous calculation that is multiplied by a first normal return coefficient having a value between 0 and 1, and (ii) the main physical quantity from a latest detection that is multiplied by a second normal return coefficient that is derived from subtracting the first transition coefficient from 1.

7. The sensor device of claim 1, wherein
during a normal return wait period from the detection of the abnormality in the main output signal to an establishment of normal return of the main output signal to a normal state,
the physical quantity calculator calculates the target physical quantity as a normal return asymptotic value that is calculated based on a difference of (i) the target physical quantity from a previous calculation, and (ii) the main physical quantity from a latest detection.

8. The sensor device of claim 1, wherein
the controller includes a differentiator for calculating a differential value of the target physical quantity,
the differentiator sets a differential value of the main physical quantity as a differential value of the target physical quantity, when the main output signal is normal, and
the differentiator calculates, during the transition period, the differential value of the target physical quantity, based on the sub physical quantity and the main physical quantity before the detection of abnormality.

9. The sensor device of claim 1, wherein
the controller includes an integrator for calculating an integral value of the target physical quantity,
the integrator sets an integral value of the main physical quantity as an integral value of the target physical quantity, when the main sensor signal is normal, and
the integrator calculates, during the transition period, the integral value of the target physical quantity, based on the sub physical quantity and the main physical quantity before the detection of abnormality.

10. The sensor device of claim 1, wherein
the main sensor element and the sub sensor element are respectively implemented as a magnetism detection element for detecting a magnetic flux of a detection object as the target physical quantity.

11. The sensor device of claim 10, wherein
the main sensor element and the sub sensor element respectively detect a change of the magnetic flux according to a change of torque.

12. An electric power steering device comprising:
the sensor device of claim 11;
a motor configured to output an assist torque for assisting a steering operation of a steering member by a driver of a vehicle; and
a power transmission unit configured to transmit the assist torque from the motor to a drive object, wherein
the physical quantity calculator calculates a steering torque as the target physical quantity, and
the controller includes a motor controller that controls a drive of the motor based on the steering torque.

13. An electric power steering device comprising:
a sensor device comprising:
 a main sensor including (i) a main sensor element for detecting a physical quantity of a detection object and (ii) a main output circuit for generating and outputting a main output signal that includes a main sensor signal corresponding to a detection value of the main sensor element;
 a sub sensor including (i) a sub sensor element for detecting a physical quantity of the detection object and (ii) a sub output circuit for outputting a sub output signal that includes a sub sensor signal corresponding to a detection value of the sub sensor element, a timing of output of the sub output signal shifted from a timing of output of the main output signal by an amount shorter than one signal cycle; and
 a controller comprising:
  a signal obtainer configured to obtain the main output signal and the sub output signal;
  an abnormality detector configured to detect an abnormality of the main output signal and the sub output signal; and
  a physical quantity calculator configured to calculate a target physical quantity by using at least one of the main sensor signal and the sub sensor signal;
a motor configured to output an assist torque for assisting a steering operation of a steering member by a driver of a vehicle; and
a power transmission unit configured to transmit the assist torque from the motor to a drive object, wherein
the physical quantity calculator uses a main physical quantity that is calculated based on the main sensor signal as the target physical quantity, when the main output signal is normal, and wherein
the physical quantity calculator calculates the target physical quantity, during a transition period from a detection of the abnormality in the main output signal to an establishment of the abnormality of the main output signal, based on both of (i) a sub physical quantity that is calculated based on the sub sensor signal, and (ii) the main physical quantity generated before the detection of the abnormality in the main output signal, and wherein
the physical quantity calculator calculates a steering torque as the target physical quantity, and wherein
the controller includes a motor controller that controls a drive of the motor based on the steering torque.

* * * * *